US012746946B1

(12) United States Patent
Kobilarov et al.

(10) Patent No.: US 12,746,946 B1
(45) Date of Patent: Sep. 29, 2026

(54) DETERMINING RELEVANT OBJECTS AND RELEVANT OBJECT TRAJECTORIES

(71) Applicant: Zoox, Inc., Foster City, CA (US)

(72) Inventors: Marin Kobilarov, Baltimore, MD (US); Linjun Zhang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 344 days.

(21) Appl. No.: 18/591,620

(22) Filed: Feb. 29, 2024

(51) Int. Cl.
*B60W 60/00* (2020.01)
*B60W 30/18* (2012.01)

(52) U.S. Cl.
CPC .................. *B60W 60/0011* (2020.02); *B60W 30/18163* (2013.01); *B60W 2552/53* (2020.02); *B60W 2554/40* (2020.02); *B60W 2556/40* (2020.02)

(58) Field of Classification Search
CPC ....... B60W 60/0011; B60W 30/18163; B60W 2552/53; B60W 2556/40; B60W 2554/40; G05D 1/00; G08G 1/00; G01C 21/00
See application file for complete search history.

(56) References Cited

U.S. PATENT DOCUMENTS

| | | | | |
|---|---|---|---|---|
| 4,862,373 A * | 8/1989 | Meng | G01C 21/3878 | 701/410 |
| 5,548,516 A * | 8/1996 | Gudat | G05D 1/0272 | 701/518 |
| 7,512,475 B2 * | 3/2009 | Perisho, Jr. | B60K 31/12 | 701/72 |
| 8,280,623 B2 * | 10/2012 | Trepagnier | G05D 1/024 | 701/28 |
| 9,643,650 B2 * | 5/2017 | Sim | B60K 31/0008 | |
| 9,950,708 B1 * | 4/2018 | Cullinane | B60W 30/09 | |
| 10,649,459 B2 | 5/2020 | Wang | | |
| 11,619,946 B2 * | 4/2023 | Oh | G06N 3/0442 | 701/25 |
| 12,049,236 B2 * | 7/2024 | Happold | B60W 50/023 | |
| 12,060,060 B1 * | 8/2024 | Costantino | G06F 16/285 | |
| 12,291,240 B1 * | 5/2025 | Morales Morales | G06F 11/3684 | |
| 12,454,286 B2 * | 10/2025 | Ivanov | B60W 40/105 | |
| 12,594,959 B1 * | 4/2026 | Hetang | B60W 60/0011 | |
| 2005/0209766 A1 * | 9/2005 | Perisho | B60W 10/18 | 180/170 |
| 2009/0085774 A1 * | 4/2009 | Yasuhara | G08G 1/166 | 340/933 |

(Continued)

*Primary Examiner* — Angelina M Shudy
(74) *Attorney, Agent, or Firm* — Lee & Hayes, P.C.

(57) ABSTRACT

Techniques for identifying relevant objects and/or trajectories are described herein. A vehicle may identify laterally adjacent lane reference(s) and determine whether it is kinematically feasible for the vehicle to navigate to the lane reference(s). If the vehicle is unable to navigate to the lane reference, the vehicle may exclude the objects located in the associated driving lane from being included in further relevancy filtering operations. In contrast, if the vehicle can navigate to the lane reference, the vehicle may identify an object located in the driving lane of the lane reference and determine whether the object and the vehicle are predicted to overlap spatially and/or temporally. Based on identifying an overlap, the vehicle can determine a relevance score for the object trajectory and use the relevance score to determine whether the object is a relevant object and/or to determine whether the object trajectory is a relevant trajectory.

20 Claims, 7 Drawing Sheets

(56) References Cited

U.S. PATENT DOCUMENTS

| | | | | |
|---|---|---|---|---|
| 2014/0114526 | A1* | 4/2014 | Erb | B66F 9/063<br>701/28 |
| 2016/0200317 | A1* | 7/2016 | Danzl | B60W 30/09<br>701/25 |
| 2016/0313133 | A1* | 10/2016 | Zeng | B60W 60/0011 |
| 2017/0010618 | A1* | 1/2017 | Shashua | G01C 21/30 |
| 2017/0169711 | A1* | 6/2017 | Baek | G08G 1/166 |
| 2017/0372150 | A1* | 12/2017 | Mayser | B60W 30/0956 |
| 2018/0162395 | A1* | 6/2018 | Mukai | B60W 30/146 |
| 2018/0189578 | A1* | 7/2018 | Yang | G01C 21/3638 |
| 2019/0056735 | A1* | 2/2019 | Koopman | G05D 1/0077 |
| 2019/0278284 | A1* | 9/2019 | Zhang | B60W 60/0016 |
| 2020/0148201 | A1* | 5/2020 | King | G05D 1/0221 |
| 2020/0356115 | A1* | 11/2020 | Kubie | G08G 5/26 |
| 2020/0398894 | A1* | 12/2020 | Hudecek | G05D 1/0214 |
| 2021/0197798 | A1* | 7/2021 | Funke | B62D 15/0285 |
| 2022/0083065 | A1* | 3/2022 | Liu | G01C 21/26 |
| 2022/0105940 | A1* | 4/2022 | Hartnett | B60W 60/0011 |
| 2022/0126824 | A1* | 4/2022 | Kato | B60W 10/20 |
| 2022/0161816 | A1* | 5/2022 | Gyllenhammar | B60W 60/001 |
| 2022/0185288 | A1* | 6/2022 | Boydston | B60W 30/0953 |
| 2022/0185330 | A1* | 6/2022 | Boydston | B60W 40/02 |
| 2022/0250646 | A1* | 8/2022 | Kobilarov | B60W 60/0011 |
| 2022/0340138 | A1* | 10/2022 | Seegmiller | B60W 30/045 |
| 2022/0397906 | A1* | 12/2022 | Sneyders | G05D 1/0214 |
| 2023/0140569 | A1* | 5/2023 | Foster | B60W 30/146<br>701/400 |
| 2023/0234617 | A1* | 7/2023 | Tweddle | B60W 30/0953 |
| 2023/0256970 | A1* | 8/2023 | Gao | B60W 60/001<br>701/23 |
| 2023/0339506 | A1* | 10/2023 | Mamchuk | B60W 50/0098 |
| 2023/0347888 | A1* | 11/2023 | Ueno | G08G 1/165 |
| 2024/0001963 | A1* | 1/2024 | Kinakar | B60W 30/18163 |
| 2024/0025450 | A1* | 1/2024 | Churay | B60W 30/18163 |
| 2024/0092357 | A1* | 3/2024 | Kobilarov | B60W 30/0956 |
| 2024/0160206 | A1* | 5/2024 | Scelsi | G05D 1/005 |
| 2024/0174221 | A1* | 5/2024 | Wu | B60W 30/0956 |
| 2024/0174256 | A1* | 5/2024 | Narayanan | B60W 60/0013 |
| 2024/0199010 | A1* | 6/2024 | Shimizu | B60W 30/12 |
| 2024/0217521 | A1* | 7/2024 | Chen | G06V 20/588 |
| 2024/0343268 | A1* | 10/2024 | Happold | B60W 30/095 |
| 2024/0409125 | A1* | 12/2024 | Taylor | B60W 60/0011 |
| 2024/0416899 | A1* | 12/2024 | Barrera | G06V 10/82 |
| 2025/0018940 | A1* | 1/2025 | Zarringhalam | B60W 30/12 |
| 2025/0171016 | A1* | 5/2025 | Garimella | B60W 30/09 |
| 2025/0171018 | A1* | 5/2025 | Ahn | B60W 30/0956 |
| 2025/0214608 | A1* | 7/2025 | Dang | G06N 20/00 |
| 2025/0296563 | A1* | 9/2025 | Park | B60W 30/143 |
| 2026/0091779 | A1* | 4/2026 | Cao | B60W 30/09 |
| 2026/0116464 | A1* | 4/2026 | Toda | B62D 6/003 |
| 2026/0138644 | A1* | 5/2026 | Bradley | B60W 60/0011 |

* cited by examiner

400

420

| Segment | Curvature |
|---|---|
| 412 | .5 |
| 414 | .46 |
| 416 | .46 |
| 418 | .41 |

422

| Maximum curvature of the vehicle | Maximum curvature of the candidate path |
|---|---|
| .55 | .50 |

DETERMINING RELEVANT OBJECTS AND RELEVANT OBJECT TRAJECTORIES

BACKGROUND

Vehicles, such as autonomous vehicles, may navigate along designated routes. In some examples, autonomous vehicles may encounter various types of static and/or dynamic objects within an environment. In some circumstances, the autonomous vehicle may use sensors to detect and/or classify these objects. However, large numbers of detections may increase latency in the system and resources may not be sufficient to perform such numbers of detections leading to potentially unsafe driving behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
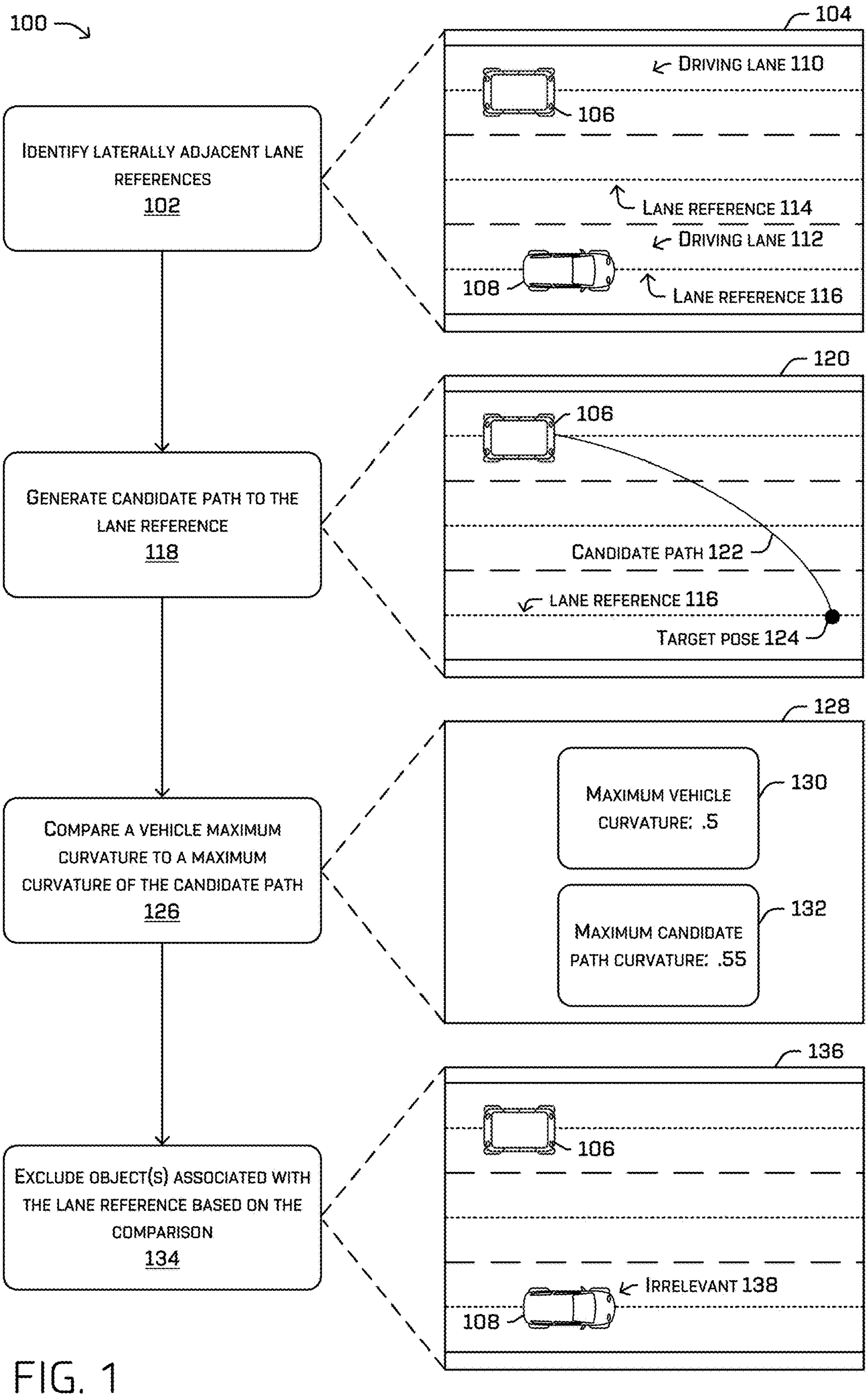
FIG. 1 is a pictorial flow diagram illustrating an example technique for determining whether a vehicle can kinematically navigate to a lane reference, in accordance with one or more examples of the disclosure.

Techniques for identifying relevant objects and/or relevant object trajectories are described herein. As discussed below, excluding object(s) that are located in unreachable driving lanes from being included in a relevance filter can increase computational efficiency. In some examples, a vehicle (such as an autonomous vehicle) may identify laterally adjacent lane reference(s) (e.g., relative to the lane within which the vehicle is located) and determine whether it is kinematically feasible for the vehicle to navigate to the lane reference(s). If the vehicle is unable to navigate to the lane reference, the vehicle may exclude the objects located in the associated driving lane from being included in further relevancy filtering operations. In contrast, if the vehicle can navigate to the lane reference, the vehicle may identify an object located in the driving lane associated with the lane reference and determine whether the object and the vehicle are predicted to overlap spatially and/or temporally. That is, the vehicle can determine an occupancy map and determine whether a trajectory of the object and the trajectory of the vehicle cause the vehicle and the object to overlap (e.g., spatially and/or temporally) at any cell within the occupancy map. Based on identifying an overlap, the vehicle can determine a relevance score for the object trajectory and use the relevance score to determine whether the object is a relevant object and/or to determine whether the object trajectory is a relevant trajectory. In some examples, the vehicle may be controlled based on the relevance scores. As described in more detail below, the techniques described herein may improve vehicle safety and/or driving efficiency by ensuring that an accurate representation of the relevant object(s) in an environment are being evaluated by the vehicle, thereby enabling the vehicle to generate more efficient and accurate trajectories.

While traversing an environment, a vehicle can analyze sensor to detect and/or classify one or more objects proximate the vehicle. In some instances, the vehicle can generate one or more candidate trajectories which may instruct the vehicle through the environment. When analyzing the efficacy and/or safety of the candidate trajectories, the vehicle may identify which of the object(s) proximate the vehicle are relevant to the vehicle. Due to computational constraints (e.g., not having enough processing resources to evaluate the impact of every object in the environment), the vehicle may reduce the number of object(s) to analyze by identifying set of objects that are relevant to the vehicle (e.g., filter out the irrelevant object(s) from further processing to save processing resources).

The system and/or technique described herein include a relevance filter system (which also may be referred to as a "relevance filter" or a "relevance filter component" configured to identify relevant object(s) and/or relevant object trajectories. Specifically, the relevance filter may identify unreachable lane references and exclude the object(s) located therein from further processing. Further, the relevance filter may compute, for the potentially relevant object(s), relevance scores corresponding to the object trajectories to enable the system to identify which object trajectories are more relevant (or important) to the vehicle than others. Technical solutions discussed herein solve one or more technical problems associated with conventional relevance filtering techniques resulting in an incomplete and/or inaccurate representation of the relevant object(s) and/or relevant object trajectories.

In some examples, the vehicle may receive a route to follow throughout the environment. Alternatively or additionally, the vehicle may receive a destination to which the vehicle is to travel. The vehicle may receive instructions (e.g., transport passengers, deliver items, etc.) to navigate from a starting location to an ending location or destination. Such instructions may be received from a fleet management system, teleoperations system, passenger or passenger device, future passenger, and/or any other source.

In some examples, the vehicle may identify laterally adjacent lane references based on the vehicle location and/or map data. That is, while navigating to the destination, the vehicle may travel within a driving lane. The vehicle may determine which driving lane the vehicle is located within by receiving map data which may indicate which of the one or more driving lanes the vehicle is associated with. Accordingly, based on the vehicle being located within a specific driving lane, the vehicle may identify one or more adjacent lane references based on the map data. A lane reference may be a center line of a driving lane and/or a line that runs substantially parallel to the lane markings of a driving lane. In some examples, the lane reference(s) may be tagged and/or annotated in map data. The map data may include information (e.g., static information) about the environment such as road information (e.g., road locations, road segment identifiers, reference line information (e.g., start location, end location, heading, shape, length, curvature, angle, distance to the road boarder, etc.). Accordingly, the vehicle may access the map data and retrieve a list of one or more lane references that are laterally adjacent to the driving lane occupied by the vehicle.

In some examples, the vehicle may determine whether the vehicle can reach the laterally adjacent lane references. A vehicle may be unable to reach a lane reference if the maximum curvature of a candidate path from the vehicle to the lane reference is larger than the maximum curvature allowed by the vehicle. That is, the vehicle may determine a maximum curvature of the vehicle based on the vehicle velocity and compare (as a comparison) the maximum curvature to a curvature of a candidate path from the vehicle location to the lane reference. If the curvature of the candidate path exceeds the maximum curvature of the vehicle, the vehicle may determine that the vehicle may be unable to navigate to the lane reference and as such, the vehicle may exclude the object(s) located in the driving lane associated with the lane reference from further processing. However, if the curvature of the candidate path is less than the maximum curvature of the vehicle, the vehicle may determine that the vehicle may be able to reach the lane reference and as such, the vehicle may include the object(s) located in the driving lane associated with the lane reference in further processing.

For example, the vehicle may determine a maximum curvature of the vehicle. The vehicle may include a database that contains various kinematic capabilities of the vehicle. In some cases, the database may include a lookup table that includes data indicative of the maximum curvature of the vehicle based on a velocity of the vehicle. The vehicle can determine a current velocity of the vehicle and use the current velocity to determine a maximum curvature of the vehicle from the database.

In some examples, the vehicle may generate a candidate path from the vehicle position to the lane reference. A candidate path may be a spatial representation of potential movements of the vehicle. To generate the candidate path, the vehicle may identify a current pose (e.g., position and/or orientation) of the vehicle within the environment. Further, the vehicle may identify a target pose (e.g., x, y, heading) of the vehicle based on the end point of the lane reference. That is, the vehicle may identify the end point (e.g., x-y coordinate) of the lane reference and use the end point to determine a target pose. In some examples, however, the vehicle may determine multiple target poses based on determining an offset heading value. For example, the vehicle may determine a target x-y coordinate and also determine multiple target heading values. Specifically, based on the target heading value, the vehicle may determine a first offset target heading (e.g., minimum heading angle) and a second offset target heading (e.g., maximum heading angle). In this case, the vehicle may generate first candidate path based on the x-y coordinate and the first offset target heading and a second candidate path based on the x-y coordinate and the second offset heading. However, this is not intended to be limiting; in other examples, the vehicle may generate a single candidate path based on a target pose at the ending location of the reference line and in other examples the vehicle may generate multiple candidate paths.

In some examples, the vehicle may generate a candidate path from the pose of the vehicle to the target pose (e.g., ending point of the reference line). In such cases, the vehicle may generate the candidate path by using the following cubic polynomial formula:

$$X(s) = a_0 + a_1 s + a_2 s^2 + a_3 s^3 \qquad \text{Equation 1}$$
$$Y(s) = b_0 + b_1 s + b_2 s^2 + b_3 s^3$$

In this equation, the X and Y values may be the values associated with a point on the candidate path. As such, the vehicle may determine the X and Y values by determining the a and b values. The vehicle may use the following formula to determine the a and b values:

$$\begin{bmatrix} a_o \\ a_1 \\ a_2 \\ a_3 \end{bmatrix} = A^{-1} \begin{bmatrix} x_0 \\ x_1 \\ \cos\theta_o \\ \cos\theta_1 \end{bmatrix}, \begin{bmatrix} b_0 \\ b_1 \\ b_2 \\ b_3 \end{bmatrix} = A^{-1} \begin{bmatrix} y_0 \\ y_1 \\ \sin\theta_0 \\ \sin\theta_1 \end{bmatrix} \qquad \text{Equation 2}$$

In this equation, the $x_0$ may represent the current x-coordinate of the vehicle. The $x_1$ may represent the target x-coordinate of the target pose. The $y_0$ may represent the current y-coordinate of the vehicle. The $y_1$ may represent the target y-coordinate of the target pose. The $\theta_0$ may represent the current heading of the vehicle. The $\theta_1$ may represent the target heading of the target pose. In this example, the matrix A may be defined as:

$$\begin{bmatrix} 1 & 0 & 0 & 0 \\ 1 & d & d^2 & d^3 \\ 0 & 1 & 0 & 0 \\ 0 & 1 & 2d & 3d^2 \end{bmatrix} \qquad \text{Equation 3}$$

In this equation, the d may represent the distance (e.g., straight line distance) from the current vehicle position to the target position. Accordingly, the vehicle may determine an inverse of Equation 3 and apply the matrix therein to Equation 2. In such cases, the vehicle may identify the a and b values which may be used in Equation 1. As such, based on performing such operations, the vehicle may determine or otherwise generate a candidate path from the current vehicle pose to the target pose.

Based on generating the candidate path, the vehicle may determine maximum curvature of the candidate path. In some examples, the vehicle may discretize the candidate path into n-number of segments based on the length d (e.g., the distance from the current vehicle position to the target position). The vehicle may determine a curvature value for each discretized segment of the candidate path. For example, the vehicle may discretize the candidate path into three segments and as such, the vehicle may determine a unique curvature value for each of the three segments. The vehicle may determine the curvature value using the following formula:

$$K = \frac{x'y' - y\prime x\prime\prime}{\left((x\prime)^2 + (y\prime)^2\right)^{3/2}} \quad \text{Equation 4}$$

In this equation, K may represent the curvature of the candidate path at the discretized segment. The vehicle may perform the operations included in Equation 4 to determine the curvature for each of the segments of the candidate path. Based on determining the curvature for the various segments, the vehicle may identify the maximum curvature of the multiple segment curvatures. The maximum curvature of the multiple segment curvatures may be considered the maximum curvature for the candidate path. However, this is not intended to be limiting; in other examples, the vehicle may determine the maximum curvature based on identifying the maximum curvature along the candidate path 408 without segmenting the candidate path 408. In examples in which the vehicle generated multiple candidate paths, the vehicle may determine a first maximum curvature for the first candidate path and second maximum curvature for the second candidate path and compare such values to determine a single maximum curvature between the multiple candidate paths. In some examples, the maximum curvature between the two candidate paths may be the lower of the two maximum curvatures. That is, the maximum curvature being compared with the maximum curvature of the vehicle may be the lower curvature between the two candidate paths. Based on identifying the maximum curvature of the multiple segments and/or multiple candidate paths, the vehicle may compare the maximum curvature of the candidate path(s) with the maximum curvature of the vehicle. If the maximum curvature of the candidate path(s) is greater than (or exceeds) the maximum curvature of the vehicle, the vehicle may exclude the object(s) located within the driving lane associated with the lane reference from further processing and/or may indicate that such object(s) are non-relevant objects. In contrast, if the maximum curvature of the candidate path(s) is less than the maximum curvature of the vehicle, the vehicle may include the object(s) located within the driving lane associated with the lane reference in further processing. In such cases, the vehicle may determine whether there is a spatial and temporal overlap with such object(s).

Based on the candidate path curvature being less than the maximum vehicle curvature, the vehicle may identify one or more objects located within the driving lane associated with the lane reference. In such examples, the vehicle may include one or more sensor devices (e.g., lidar device(s), radar device(s), image capturing device(s), time-of-flight device(s), etc.) configured to capture sensor data of the environment. The vehicle may analyze such sensor data to detect object(s) in the driving lane associated with the lane reference to which the vehicle can navigate.

In some examples, the vehicle may determine interaction scores corresponding to trajectories of the object based on a spatial and temporal overlap of the object and the vehicle. The vehicle may generate and/or receive one or more predicted trajectories associated with the object. That is, a prediction system of the vehicle may predict future trajectories that the object may follow and/or a probability that the object will follow the trajectories. In some examples, the vehicle may use such predicted object trajectories when determining whether the object is predicted to overlap spatially and/or temporally with the vehicle. Based on receiving or generating the object trajectories, the vehicle may generate an occupancy map (or occupancy grid). An occupancy map may be a map or grid that covers a region of the environment, discretized into a plurality of cells, and indicates whether the object or the vehicle are predicted to occupy a cell at any point. That is, the occupancy map may be a discretized grid that covers the region of the environment upon which the vehicle navigates. The occupancy map represents portions of the environment that cover the vehicle's trajectories (e.g., current trajectory and/or candidate trajectories). In some examples, the vehicle may generate an occupancy grid that based on a predefined length and width (e.g., 100 meters×20 meters, etc.). The occupancy map may include various object(s) within the environment.

In some examples, the vehicle may determine which cell(s) of the occupancy map the object is predicted to occupy and which cells of the occupancy map the vehicle is predicted to occupy. That is, the vehicle may determine a spatial overlap of the cells for the vehicle and for the object. In such cases, the vehicle may determine a list of one or more cells in the occupancy map that the object is predicted to occupy (e.g., spatially) based on the x-y coordinates of the predicted object trajectories. The object trajectories may include one or more states which may represent the predicted pose (e.g., position (e.g., x-y coordinate) and/or heading) of the object along the predicted trajectory. As such, the vehicle may identify, at each state of the predicted trajectory, which cell(s) the object is predicted to occupy. The vehicle may tag such cell(s) as potentially occupied by the object. Further, the vehicle may determine which cells of the occupancy map that the vehicle is predicted to occupy (e.g., spatially) based on the x-y coordinates of the trajectory of the vehicle. That is, a trajectory may include one or more states that represent the predicted vehicle state (e.g., pose data, velocity data (e.g., minimum and maximum), etc.) of the vehicle. As such, the vehicle may identify, for each state of the trajectory, which cell(s) of the occupancy map the vehicle is predicted to occupy and the vehicle may tag such cell(s) as being potential occupied by the vehicle.

Based on determining which cells of the occupancy map the vehicle and the object are predicted to occupy, the vehicle may determine whether the vehicle and the object are predicted to occupy one or more of the same cells. That is, the vehicle may evaluate the cells of the occupancy map and determine whether there are any cells that have been identified (or tagged) as being occupied by the object and the vehicle. If a cell has been tagged as being occupied by both the object and the vehicle, the vehicle may indicate that there is a potential spatial overlap with the object of interest.

Based on the vehicle and the object occupying a same cell of the occupancy map, the vehicle may determine whether the object and the vehicle occupy the cell within a similar range of times. That is, the vehicle may determine whether the object can affect the decision making of the vehicle which may be indicative of a temporal overlap at the cell at which there is a spatial overlap. An object may not affect the vehicle's decision making if a minimum time of arrival of the object to the cell is greater than a maximum time of arrival of the vehicle at the same cell plus a buffer of time (e.g., $t_{object\_min} > t_{vehicle\_max} + \Delta t$). That is, if the vehicle passed the location of the cell prior to the arrival of the object, the vehicle may determine that the object does not affect the way in which the vehicle operates and that there may not be a temporal overlap. However, if the object arrives to the cell prior to the vehicle or at the same time as the vehicle, the vehicle may determine that the object can affect the way in which the vehicle operates and that there may be a temporal overlap. As such, the vehicle may determine time values (e.g., minimum arrival time and/or maximum arrival time) corresponding to when the object may be located at or within a specific cell of the occupancy map. In some examples, the vehicle may determine, based on the predicted trajectories, a minimum and/or maximum arrival time of the object. In some examples, the vehicle may determine, based on the vehicle's trajectory, a minimum and/or maximum arrival time of the vehicle based on the vehicle's dynamics and/or capabilities (e.g., maximum and minimum accelerations, maximum and minimum velocities, current velocity, current steering angle, current heading angle, maximum and minimum steering angles/rates, etc.). That is, each state of the trajectory may include time data which may indicate a predicted maximum and/or minimum time arrival at the location of the state.

Based on the object of interest overlapping with the vehicle spatially and temporally, the vehicle may determine an interaction score (or relevance score) corresponding to states of the predicted object trajectories. The interaction score may indicate the degree (or level) of relevance of the state of the predicted object trajectory with respect to the vehicle. The interaction score may increase when the overlap (or potential collision) is predicted to occur sooner (e.g., the sum of $t_{object\_min}$ and $t_{vehicle\_min}$ is low). In contrast, the relevance score may decrease when the sum of $t_{object\_min}$ and $t_{vehicle\_min}$ increases (i.e., when the interaction occurs later). In such examples, the vehicle may determine scores (or sub-scores) that represent the relevance of the predicted object trajectory at each state of the predicted object trajectory located within the overlapping cell. In at least some examples, the score may be an exponential of a product of a weight and the sum (such that the score is proportional to $e^{-w*(t_{object\_min}+t_{vehicle\_min})}$). The vehicle may determine a unique interaction score for each state of the predicted object trajectory located within the overlapping cell. As described below, the vehicle may utilize the interaction scores of the states associated with the object trajectory to determine an object trajectory relevance score and/or an object relevance score.

In some examples, the vehicle may determine a relevance score corresponding to the object trajectory based on the interaction scores (or set of scores) of the states (or set of states). The purpose of determining relevance scores for the predicted trajectories of the object is to be able to determine which of the predicted trajectories are more relevant to the vehicle than others. This may be especially important if a relevance filtering system evaluates a finite number of trajectories for each object. As such, the vehicle may determine a relevance score for the object trajectory by evaluating the individual state interaction scores. That is, the vehicle may perform a max pooling, down sampling technique. For example, the vehicle may identify the states of the trajectory with interaction scores and group these states into clusters. In this case, each cluster may include two states; however, in other examples, the clusters may include more or fewer states. Based on clustering the states, the vehicle may down sample the states by selecting a single state with the highest interaction score from each cluster (e.g., results in a subset of scores). For example, if a cluster has a first state with an interaction score of 0.4 and a second state with an interaction score of 0.9, the vehicle may select the second state since the second state has a higher interaction score.

In some examples, based on down sampling the states, the vehicle may determine a discounted sum of the down sampled states. That is, the vehicle may add the interaction scores of the down sampled states together based on a weight. Specifically, the vehicle may determine the discounted sum by using the following formula:

$$S = \sum_{i=0}^{n} \gamma_i s_i \qquad \text{Equation 5}$$

In this equation, the S may represent the discounted sum of the down sampled interaction scores. The γ may represent a weight that increases as the interaction score of each state is added. The s may represent the interaction score of the down sampled states. This equation ensures that the interactions that occur sooner are weighted higher than the interactions that occur later. Based on determining the discounted sum, the vehicle may determine a normalized sum by modifying the discounted sum to be between 0 and 1. The vehicle may determine the normalized sum using the following formula:

$$R = 1 - \exp(-\alpha S) \qquad \text{Equation 6}$$

In this equation, the R may represent the normalized sum (e.g., overall score) which may be the relevance score of the object trajectory. The a may be a constant wight to control the rate of the exponential function. S may represent the discounted sum of determined using Equation 5. In some examples, the vehicle may determine a relevance score (or normalized sum) for some or all of the predicted trajectories of the object. In such instances, the vehicle may determine plurality of relevance scores each corresponding to a predicted trajectory of a plurality of predicted trajectories of the object.

In some examples, the vehicle may determine a relevance score of the object based on the relevance scores of the object trajectories. To determine the relevance score of an object, the vehicle may evaluate the relevance scores of each of the predicted trajectories corresponding to the object and/or the probabilities of such predicted trajectories. For example, the vehicle may determine the object relevance score using the following formula:

$$A = \sum_{i=0}^{n} p_i R_i \qquad \text{Equation 7}$$

In this equation, the A may represent the relevance score of the object. The p may represent the probability (or likelihood) that the object may follow the specific predicted trajectory. The R may represent the normalized sum determined using Equation 6. As such, the vehicle may multiply the probability of a predicted trajectory with the relevance score of that trajectory and perform such operations for all the predicted trajectories. Based on performing such operations, the vehicle may add all the values into a single result which may represent the relevance score for the object.

In some examples, the vehicle may send data associated with one or more of the object(s) with the highest relevance scores and/or scores which meet or exceed a threshold relevance score to a prediction and/or planning component. The vehicle may determine a threshold number of object(s) which may be sent to prediction and/or planning components. In such cases, the vehicle may identify the object(s) with the highest relevance scores that are above the threshold number. The identified object(s) may be sent to the prediction and/or planning components for further processing and may ultimately be used to control the vehicle. In some examples, the number of object(s) to send to the prediction and/or planning components may be based on an amount of processing power and/or memory available for a processing operation (e.g., to ensure that a number of object(s) can be considered within a particular period of time).

In addition to sending the number of object(s) with the highest relevance scores, the vehicle may send data associated with one or more of the predicted trajectories with the highest relevance scores and/or scores which meet or exceed a threshold relevance score to a prediction and/or planning component. As discussed above, some prediction and/or planning components may limit the number of predicted trajectories that may be sent and/or evaluated. As such, the vehicle may leverage the trajectory relevance scores to determine which predicted trajectories are most important to send to the downstream components. In this example, the vehicle may identify the predicted trajectories with the highest relevance scores that are above the threshold. The identified predicted trajectories may be sent to the prediction and/or planning components for further processing and may ultimately be used to control the vehicle. In some examples, the number of predicted trajectories to send to the prediction and/or planning components may be based on an amount of processing power and/or memory available for a processing operation (e.g., to ensure that one or more predicted trajectories can be considered within a particular period of time).

Though it has been described that the relevance filter may exclude object(s) from further processing based on evaluating curvature data, in other examples the relevance filter may evaluate other kinematic constraints. For example, the relevance filter may generate the candidate path and determine, based on a current acceleration and/or velocity of the vehicle, whether it is kinematically feasible for the vehicle to reach specific lane references. In other examples, the vehicle may determine a maximum acceleration capable of being performed on the candidate path and then determining whether the vehicle can reach certain lane references. Of course, any other kinematic and/or dynamic limitations may be used as constraints to identify unreachable portions of the environment.

As illustrated by these examples, the techniques described herein can improve the functioning, safety, and efficiency of autonomous and semi-autonomous vehicles traversing through driving environments by using candidate paths to identify whether the vehicle is able to reach driving lanes adjacent to the vehicle. Identifying unreachable lane references may enable the relevance filter to limit the number of object(s) to consider which may save computing resources. Further, by determining a relevance score for the object trajectories, the vehicle may be able to consider the most important and/or relevant trajectories of the object. Evaluating such trajectories may enable the vehicle to plan and/or perform safer and/or more efficient driving maneuvers.

As noted above, by performing the processes describe herein, the autonomous vehicle may reduce the number of objects that the planner component analyzes when determining actions for the autonomous vehicle to perform. By reducing the number of objects to consider, the relevance filter may reduce the size of data to be processed. Further, the techniques discussed herein can reduce an amount of processing time without reducing an accuracy (or by minimizing any reduction of accuracy) of identifying relevant objects, which can reduce a latency of processing systems. Reducing latency can improve safety outcomes and/or comfort levels by controlling an autonomous vehicle, for example, to alter a trajectory or otherwise navigate the autonomous vehicle safely in an environment.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining whether a vehicle can kinematically navigate to a lane reference. As shown in this example, some or all of the operations in the example process 100 may be performed by a perception component, prediction component, a planning component, and/or any other component or systems within an autonomous vehicle. For instance, as shown in this example, example process 100 may be implemented using a relevance filter. As described below in more detail, the relevance filter may include various components, such as a lane reference component, an interaction component, a relevant trajectory determining component, and/or a relevant object determining component.

At operation 102, the relevance filter may identify laterally adjacent lane reference(s). In some examples, when performing a relevance filter technique, the relevance filter may limit the number of object(s) to consider (or evaluate) by excluding object(s) based on the object(s) being located in driving lanes that are unreachable by the vehicle. As such, the vehicle may identify a list of one or more adjacent lane reference(s) from map data. For example, box 104 illustrates a driving environment in which a vehicle is in a driving lane with multiple laterally adjacent lane references. In this example, box 104 may include a vehicle 106 and an object 108. The vehicle may be navigating within a driving lane 110 while the object 108 may be navigating in a driving lane 112. As shown in this example, vehicle 106 may identify an adjacent lane reference 114 as well as an adjacent lane reference 116. However, this is not intended to be limiting; in other examples, there may be more or fewer lane reference proximate the vehicle 106.

At operation 118, the relevance filter may generate a candidate path to the lane reference 116. The relevance filter may determine whether a lane reference is unreachable based on comparing a maximum curvature of a candidate path to the maximum capable curvature of the vehicle. As such, the relevance filter may generate a candidate trajectory to the lane reference. For example, box 120 illustrates a candidate path 122 extending from the vehicle 106 to the lane reference 116. In this example, the candidate path 122 may be generated from the vehicle 106 to a target pose 124. The target pose 124 may include a ending position (or state) of the lane reference 116 as well as a target heading (e.g., based on a heading of the lane reference 116) of the vehicle 106. As such, the relevance filter may use Equations 1-3 described above to generate the candidate path 122 from the vehicle 106 to the target pose 124. However, this example is not intended to be limiting; in other examples, the relevance filter may generate more than one candidate paths based on differing the target heading associated with the target pose 124.

At operation 126, the relevance filter may compare a vehicle maximum curvature to a maximum curvature of the candidate path. As noted above, to determine whether the vehicle 106 is kinematically able to reach the lane reference 116, the relevance filter may compare the curvature of the candidate path 122 to the maximum allowed curvature of the vehicle. For example, box 128 illustrates two boxes including the maximum curvatures for the vehicle 106 and for the candidate path 122. In this example, box 130 may indicate that the maximum vehicle curvature may be 0.5/m (e.g., curvature may be 0.5 rad/m). The relevance filter may determine the maximum vehicle curvature based on a current velocity of the vehicle, a current acceleration of the vehicle, weather conditions, time of day, angle of road banking, and/or any other type of factor. That is, the relevance filter may include database including maximum curvature values for the vehicle organized based on vehicle 106 velocity. As such, the relevance filter may determine a velocity and use such data to determine the maximum vehicle curvature.

As shown in FIG. 1, the maximum curvature of the candidate path 122 may be 0.55. Though not shown in FIG. 1, the relevance filter may determine the maximum curvature of the candidate path 122 by discretizing the candidate path 122 into multiple segments and determining a curvature for each segment. That is, if the candidate path 122 is discretized into five segments, the relevance filter may determine five curvature values, one for each segment. The relevance filter may determine the curvature value for a segment and/or for the candidate path 122 using Equation 4. Based on having determined the curvature for each of the segments, the relevance filter may identify the segment with the highest (or largest) curvature value. In this case, the segment with the highest curvature value may be the maximum curvature of the candidate path 122 which may be 0.55. Additional description regarding the manner in which the maximum curvature of the candidate path 122 is determined is discussed in FIG. 4. In some examples, the relevance filter may compare the curvature value in box 130 with the curvature value in box 132. As shown, the maximum curvature of the candidate path 122 may exceed the maximum curvature value of the vehicle 106.

At operation 134, the relevance filter may exclude object(s) associated with the lane reference 116 based on the comparison performed at operation 126. In this case, the comparison performed at operation 126 may indicate that the maximum curvature of the candidate path 122 exceeds the maximum allowed curvature of the vehicle 106. As such, the relevance filter may identify object(s) located in the driving lane 112 and exclude such object(s) from further processing and/or indicate that the object(s) are irrelevant to the vehicle 106. For example, box 136 illustrates the driving environment with the vehicle 106 and the object 108. In this example, the relevance filter may indicate that the object 108 may be irrelevant 138 to the vehicle 106 based on the object 108 being located within an unreachable driving lane. As such, the relevance filter may exclude the object 108 from further processing in the relevance filtering pipeline.

Figure 2:
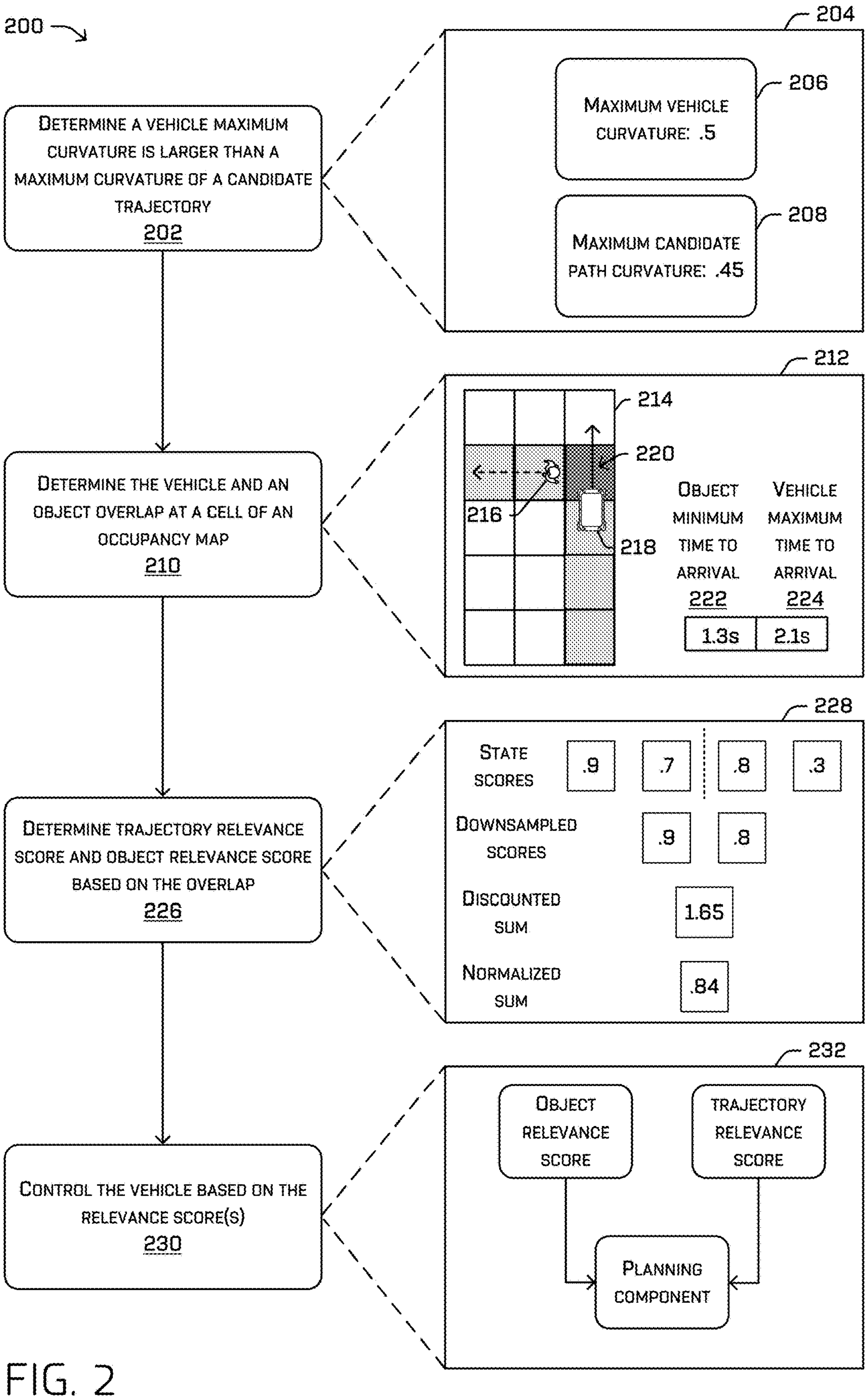
FIG. 2 is a pictorial flow diagram illustrating an example technique for determining relevant objects and/or relevant object trajectories, in accordance with one or more examples of the disclosure.

FIG. 2 is a pictorial flow diagram illustrating an example process 200 for determining relevant objects and/or relevant object trajectories. As shown in this example, some or all of the operations in the example process 200 may be performed by a perception component, prediction component, a planning component, and/or any other component or systems within an autonomous vehicle. For instance, as shown in this example, example process 100 may be implemented using a relevance filter. As described below in more detail, the relevance filter may include various components, such as a lane reference component, an interaction component, a relevant trajectory determining component, and/or a relevant object determining component. In some examples, the operations performed and/or described in FIG. 2 may be performed along with the operations described in FIG. 1. However, in other examples, the operations described in FIG. 2 can be performed independent of the operations described in FIG. 1.

At operation 202, the relevance filter may determine a vehicle maximum curvature is larger than a maximum curvature of a candidate trajectory. In some examples, a vehicle navigating an environment may determine whether to evaluate various object(s) in the relevancy filter pipeline based on whether such object(s) are located in kinematically reachable driving lanes. As described in FIG. 1, the vehicle can identify lane references proximate the vehicle, generate a candidate path to the lane reference, determine a maximum curvature of the candidate path, and/or determine whether the maximum curvature of the candidate path exceeds that of the vehicle maximum curvature. For example, box 204 illustrates two boxes including the maximum curvatures for the vehicle and for the candidate path. In this example, box 206 may indicate that the maximum vehicle curvature may be 0.5. The relevance filter may determine the maximum vehicle curvature based on a current velocity of the vehicle. That is, the relevance filter may include database including maximum curvature values for the vehicle organized based on vehicle velocity. As such, the relevance filter may determine a velocity and use such data to determine the maximum vehicle curvature.

As shown in FIG. 2, the maximum curvature of the candidate path may be 0.45. The relevance filter may use the techniques described above and below to determine the maximum curvature of the candidate path. Further, the relevance filter may determine the curvature value for the candidate path using Equation 4. Additional description regarding the manner in which the maximum curvature of the candidate path is determined is discussed in FIG. 4. In some examples, the relevance filter may compare the curvature value in box 206 with the curvature value in box 208. As shown, the maximum curvature of the candidate path may be less than the maximum curvature value of the vehicle. As such, the relevance filter may include the object(s) associated with the lane reference in the relevance filtering pipeline, as described below.

At operation 210, the relevance filter may determine the vehicle and the object overlap at a cell of an occupancy map. That is, to determine whether the object associated with the lane reference is relevant to the vehicle, the relevance filter may determine whether the object and the vehicle interact at a future time. The relevance filter may make such a determination by generating an occupancy map and determining whether predicted trajectories of the object and a trajectory of the vehicle cause the object and the vehicle to overlap at one or more cells of the occupancy map physically and temporally. For example, box 212 illustrates an occupancy map 214 indicating which of the plurality of cells the object 216 and/or vehicle 218 are projected to occupy. In this example, the occupancy map 214 may include three columns and five rows; however, in other examples, the occupancy map 214 may include more or less columns and/or rows. Furthermore, the discretization of the map may vary and the data stored in the cells of the occupancy map vary. That is, the cells may store probability data indicative of whether the object 216 and/or the vehicle 218 are predicted to be located in the cell; however, in other examples, the cells may store a binary indication (e.g., "yes" or "no") describing if the object 216 and/or the vehicle 218 are predicted to be located in the cell at any point in time.

In some examples, the relevance filter may determine whether the object 216 and the vehicle 218 physically (or spatially) occupy one or more of the same cells of the occupancy map 214. The relevance filter may perform a uniform arclength sampling for some or all positions of the vehicle along the vehicle trajectory and/or perform a uniform time-based sampling along the predicted object trajectories. As shown in box 212, the relevance filter may evaluate each state of the predicted trajectory of the object 216 and of the trajectory of the vehicle 218. At each state of the predicted trajectory of the object 216, the relevance filter may determine which cell the object 216 is predicted to be located within. The relevance filter may tag such cells as being cells within which the object 216 is predicted to be located within based on the object 216 following the predicted trajectory. Further, the relevance filter may determine which cells the vehicle 218 is predicted to be located within at each state of the vehicle trajectory. The relevance filter may tag such cells as being cells within which the vehicle 218 is predicted to be located within based on the vehicle 218 following the trajectory. As shown in the occupancy map 214, the relevance filter may highlight such occupied cells in a light grey. Further, the relevance filter may highlight the cells within which both the object 216 and the vehicle 218 are predicted to occupy with a darker grey. As such, the cell 220 may be indicative of a cell that the object 216 and the vehicle 218 are predicted to occupy. Thus, the relevance filter may determine that the object 216 and the vehicle 218 are predicted to spatially overlap at the cell 220.

Based on the object 216 and the vehicle 218 overlapping at cell 220, the relevance filter may determine whether the object 216 and the vehicle 218 temporally overlap at the cell 220. That is, the relevance filter may determine whether the object 216 can affect the vehicle's decision making. If the object 216 can affect the vehicle's decision making, the relevance filter may determine that the object 216 is relevant to the vehicle 218. In some examples, the relevance filter may determine that the object 216 does not affect the decision making of the vehicle 218 if a minimum time of arrival (e.g., the fastest the object can arrive at the cell 220) of the object 216 to the cell 220 is greater than a maximum time (e.g., the slowest the vehicle 218 can arrive at the cell 220 based on the trajectory) of arrival of the vehicle 218 at the cell 220 (e.g., $t_{object\_min} > t_{vehicle\_max}$). As such, the relevance filter may determine the minimum time to arrival 222 for the object 216 and determine the maximum time to arrival 224 for the vehicle 218. In this example, the relevance filter may determine that the minimum time to arrival 222 of the object 216 may be 1.3 seconds and the maximum time to arrival 224 of the vehicle 218 may be 2.1 seconds. As such, based on the minimum time to arrival 222 (e.g., $t_{object\_min}$) being 1.3 seconds which is less than the maximum time to arrival 224 (e.g., $t_{vehicle\_max}$) of 2.1 seconds, the relevance filter may determine that the object 216 may affect the decision making of the vehicle 218 and as such, the relevance filter may determine that the object 216 may be relevant to the vehicle 218. Based on the overlap, the relevance filter may generate interaction scores for some or all states of the predicted object trajectory that are within the cell 220. In such examples, the vehicle may determine scores (or sub-scores) that represent the relevance of the predicted object trajectory at each state of the predicted object trajectory located within the overlapping cell. In at least some examples, the score may be an exponential of a product of a weight and the sum (such that the score is proportional to $e^{-w^*(t_{object\_min}+t_{vehicle\_min})}$).

At operation 226, the relevance filter may determine a trajectory relevance score and an object relevance score based on the overlap. That is, the relevance filter may use the interaction scores of the various state(s) of the predicted object trajectory to determine a relevance score for the predicted object trajectory and/or for the object 216.

The relevance filter may perform a down sampling operation on the states with interaction scores. For example, box 228 illustrates multiple interaction scores being evaluated to determine a relevance score for an object trajectory. In this example, box 228 includes four states of the predicted object trajectory that have interaction scores. As shown, the first state may have an interaction score of 0.9, the second state may have an interaction score of 0.7, the third state may have an interaction score of 0.8, and the fourth state may have an interaction score of 0.3. In this example, the first and second states may be grouped into a single cluster and the third and fourth states may be grouped into a second cluster. Accordingly, the relevance filter may perform the max pooling down sample technique by selecting the state from each cluster with the highest interaction score. In this example, the relevance filter may select the first state from the first cluster based on the first state having a higher interaction score than the second state. Further, the relevance filter may select the third state from the second cluster based on the third state having a higher interaction score than the fourth state.

Based on determining the down sampled states, the relevance filter may determine a discounted sum associated to the down sampled states. For example, the relevance filter may combine the down sampled state interaction scores into a single value. In this example, the relevance filter may determine the discounted sum using Equation 5. As shown in box 228, the discounted sum may be 1.65. Based on determining the discounted sum, the relevance filter may determine a normalized sum to modify the discounted sum to be between 0 and 1. The relevance filter may determine the normalized sum using Equation 6. As shown, the normalized sum may be 0.84. In this example, the normalized sum may represent the relevance score associated with the predicted trajectory of the object 216.

In some examples, the relevance filter may utilize the predicted trajectory relevance score to determine a relevance score corresponding to the object 216. That is, to determine which of the object(s) are the most relevant to the vehicle, the relevance filter may determine relevance scores for the object(s). The relevance filter may determine the object relevance score using Equation 7. As such, the relevance filter may include relevance score associated with the object 216 and/or relevance scores associated with the predicted trajectories of the object 216.

At operation 230, the vehicle may be controlled based at least in part on the relevance scores determined in operation 226. That is, the relevance filter may send one or more object(s) to downstream processes based on the relevance score of the object being above a threshold value and/or within a top threshold number of object(s). Further, the relevance filter may send one or more predicted trajectories of the object to downstream processes based on the relevance score of the predicted trajectories being above a threshold value and/or within a top threshold number of predicted trajectories associated with the object. For example, box 232 illustrates the relevance filter sending the relevance scores of the object and predicted trajectories as well as any other type of object data to a planning component. In this example, the relevance filter may send the object relevance scores and/or predicted trajectory scores to the planning component such that the planning component may use such information when planning an action for the vehicle.

Figure 3:
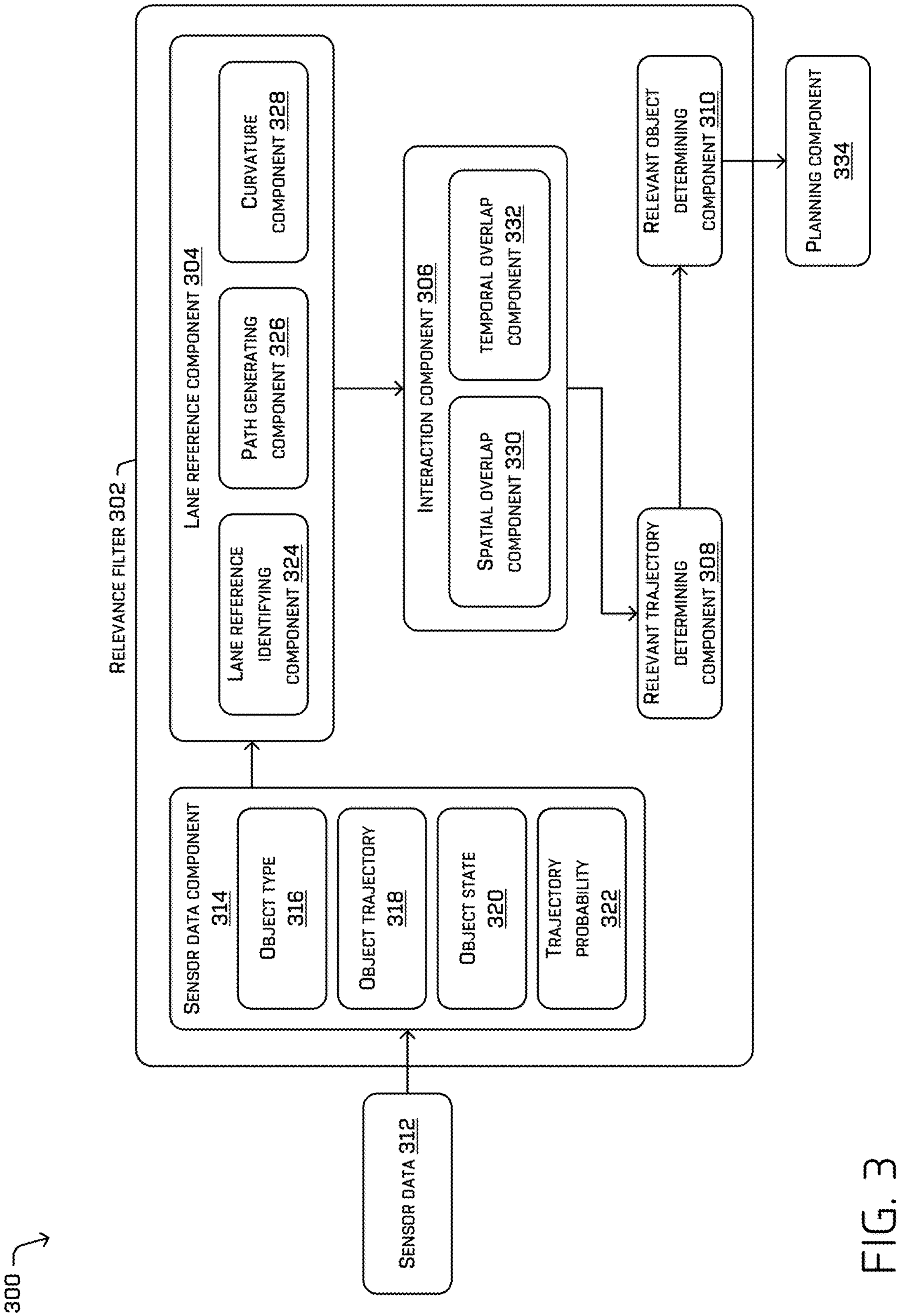
FIG. 3 illustrates an example computing system including a relevance filter configured to identify relevant objects and/or relevant object trajectories, in accordance with one or more examples of the disclosure.

FIG. 3 illustrates an example computing system 300 including a relevance filter 302 configured to identify relevant objects and/or relevant object trajectories.

In some examples, the relevance filter 302 may be similar or identical to the relevance filter described above, or in any other examples herein. As noted above, in some cases the relevance filter 302 may be implemented within or otherwise associated with a perception component, prediction component, and/or planning component of an autonomous vehicle. In some examples, the relevance filter 302 may include various components, described below, configured to perform different functionalities of a technique to identify relevant object(s) and/or relevant object trajectories. In some examples, the relevance filter 302 may include a lane reference component 304 configured to identify and/or evaluate lane references proximate a vehicle, an interaction component 306 configured to determine whether the object and the vehicle spatially and/or temporally overlap, a relevant trajectory determining component 308 configured to identify relevant object(s), and/or a relevant object determining component 310 configured to identify relevant object trajectories.

In some examples, the relevance filter 302 may receive sensor data 312 from one or more sensor devices within (or otherwise associated with), perception components, and/or prediction components of the autonomous vehicle. As shown in FIG. 3, the sensor data 312 may be sent to the sensor data component 314. In such instances, the sensor data 312 may represent a current driving scenario and/or driving condition proximate the vehicle. A driving scenario may include vehicle information (e.g., trajectory data, (e.g., velocity, acceleration steering angle, etc.), pose data, etc.), object information (e.g., a trajectory of the object(s), a pose of the object(s), a number of object(s), a type of the object(s), a past trajectory of the object(s), etc.) and/or any other information.

In some examples, the sensor data component 314 may include one or more subcomponents associated with different types of data contained in the sensor data 312. As illustrated in FIG. 3, the sensor data 312 may include object type data, object trajectory data, object state data, and/or trajectory probability data. However, this is not intended to be limiting; in other examples, the sensor data 312 may include more or less types of data. As shown, the sensor data component 314 may include an object type component 316 configured to receive, store, and/or synchronize object type data indicative of the type or classification of object(s) within the environment, an object trajectory component 318 configured to receive, store, and/or synchronize object trajectory data indicative of the predicted trajectory of the object(s) in the environment, an object state component 320 configured to receive, store, and/or synchronize object state data which may indicate the state (e.g., pose (e.g., position and/or heading), velocity, acceleration, etc.) of the object, and/or a trajectory probability component 322 configured to receive, store, and/or synchronize trajectory probability data indicative of a probability the object will follow the predicted trajectory. In some examples, the sensor data component 314 may send the data stored therein to the lane reference component 304.

In some examples, the relevance filter 302 may include a lane reference component 304 configured to identify one or more lane references proximate the vehicle. As shown in FIG. 3, the lane reference component 304 may receive various types of data from the sensor data component 314. In this example, the lane reference component 304 may include one or more subcomponents such as a lane reference identifying component 324, a path generating component 326, and/or a curvature component 328. The lane reference identifying component 324 may be configured to identify laterally adjacent lane references. For example, the relevance filter may receive sensor data and determine, based on the sensor data and/or map data, that the vehicle is located within a particular driving lane. As such, the lane reference identifying component 324 may identify the one or more lane references that are laterally adjacent to the particular driving lane within which the vehicle is navigating.

In some examples, the path generating component 326 may be configured to generate a candidate path from the current pose of the vehicle to a target pose associated with the lane reference identified by the lane reference identifying component 324. A target pose may include an end position of the lane reference (e.g., obtained from map data) as well as a target heading associated the lane reference. The path generating component 326 may generate the candidate path using Equations 1-3.

In some examples, the curvature component 328 may be configured to determine a maximum curvature of the candidate path and compare such a value to a maximum curvature allowed by the vehicle. That is, the curvature component 328 may determine a maximum curvature of the vehicle based on accessing a database containing kinematic data associated with the vehicle. For example, the curvature component 328 may determine a current velocity of the vehicle and use the current velocity to retrieve a maximum curvature of the vehicle from the database. The curvature component 328 may also determine a maximum curvature of the candidate path. As noted above, the curvature component 328 may discretize the candidate path into one or more segments. The number and/or distance between segments may be based on a distance from the vehicle position and/or a target position. In such cases, the curvature component 328 may determine an individual curvature value for each segment of the candidate path.

The curvature component 328 may use Equation 4 to determine the curvature of a segment of the candidate path. Based on determining an individual curvature for each segment, the curvature component 328 may determine which segment has the highest curvature value. The segment with the highest curvature value may be considered the maximum curvature of the candidate path. Accordingly, the curvature component 328 may compare the maximum curvature of the path with the maximum curvature of the vehicle. If the maximum curvature of the path is less than the maximum curvature of the vehicle, the curvature component 328 may send data associated with the lane reference and/or the object information associated thereto to the interaction component 306. In contrast, if the maximum curvature of the path is larger than the maximum curvature of the vehicle, the curvature component 328 may exclude the lane reference and/or the object information from being sent to the interaction component 306.

In some examples, the interaction component 306 may be configured to determine whether an object located within a driving lane associated with the lane reference and the vehicle spatially and/or temporally overlap based on following the object following an object trajectory and the vehicle trajectory. As shown, the interaction component 306 may include one or more subcomponents such as a spatial overlap component 330 and a temporal overlap component 332. The spatial overlap component 330 may determine whether the vehicle and the object are predicted to occupy the same cell in an occupancy grid. That is, the spatial overlap component 330 may generate an occupancy grid that includes multiple cells that may identify whether the object and vehicle are predicted to occupy the cell. If the spatial overlap component 330 determines that the occupancy grid includes a cell that is occupied by both the vehicle and the object, the spatial overlap component 330 may determine that the object and vehicle physically overlap within cell. Based on the physical overlapping, the temporal overlap component 332 may be determine whether the object and vehicle overlap at the cell temporally. That is, the temporal overlap component 332 may determine whether the object may affect the decision making of the vehicle and if so, the temporal overlap component 332 may determine that the object is relevant to the vehicle and that the object and vehicle temporally overlap. In such cases, the interaction component 306 may be configured to generate an interaction score for each state of the object trajectory located within the overlapping cell. The interaction component 306 may determine the relevance score according to the formula, Interaction Score=$\exp(-w^*(t_{object\_min}+t_{vehicle\_min})$. In this equation, the Interaction Score may represent the degree to which the state of the object trajectory is relevant to the vehicle. W may represent a weight value that is a positive constant controlling the decay rate of the score. $T_{object\_min}$ may represent the minimum time of arrival of the object at the overlapping cell, as described above. $T_{vehicle\_min}$ may represent the minimum time of arrival of the vehicle at the overlapping cell, as described above. The interaction component 306 may send the interaction score data to the relevant trajectory determining component 308.

In some examples, relevance filter 302 may include a relevant trajectory determining component 308 configured to identify relevant object(s). The relevant trajectory determining component 308 may use the interaction scores of the states associated with the object trajectory to determine a relevance score associated with the object trajectory. Specifically, the relevant trajectory determining component 308 may determine clusters of states. In such cases, the relevant trajectory determining component 308 may down sample the states by selecting the state in each cluster with the highest interaction score. Based on the down sampled states, the relevant trajectory determining component 308 may determine a discounted sum of the down sampled states using Equation 5. The relevant trajectory determining component 308 may determine a normalized sum of the discounted sum using Equation 6. The normalized sum may be the relevance score for the object trajectory.

In some examples, relevance filter 302 may include a relevant object determining component 310 configured to identify relevant object trajectories. In some examples, the relevant object determining component 310 may use the relevance score of the object trajectories to determine the object relevance score. The relevant object determining component 310 may determine the relevance score using Equation 7. Based on identifying the relevance score(s) for the various object(s) proximate the vehicle, the relevant object determining component 310 and/or the relevance filter 302 may send one or more object(s) and/or object trajectories to a planning component 334. The relevance filter 302 may send the one or more object(s) with the highest relevance score(s). Further, the relevance filter 302 may send one or more object trajectories based on the associated relevance score being above a threshold number of other trajectory relevance scores and/or being above a threshold relevance score. The planning component 334 may use such information to plan future actions.

Figure 4:
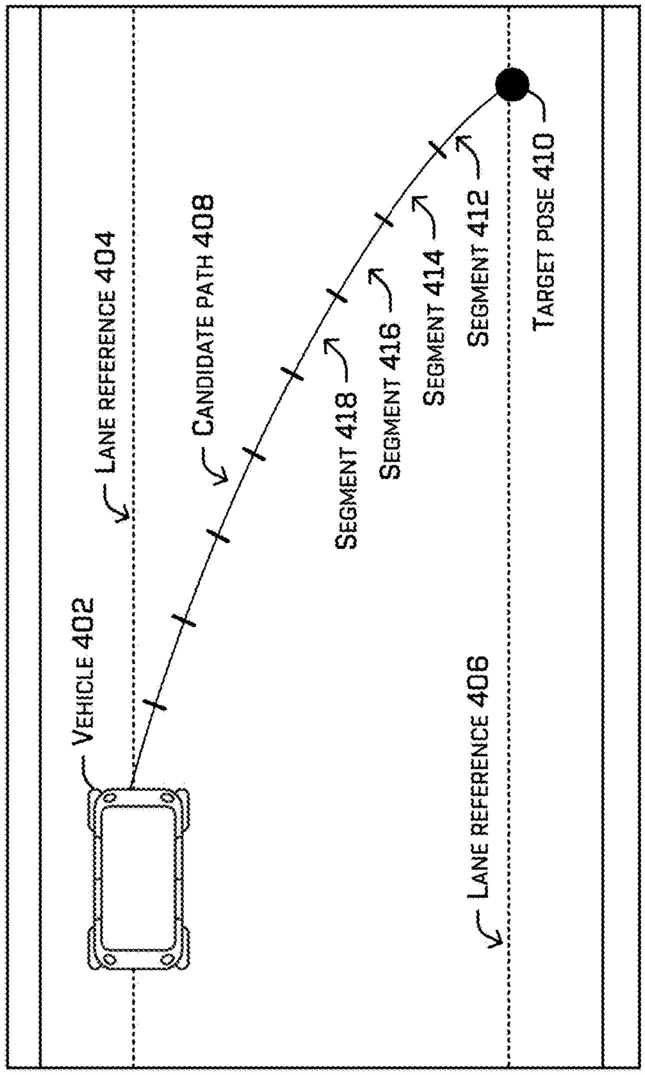
FIG. 4 illustrates an example environment including comparing a maximum curvature of a candidate path with a maximum curvature of a vehicle, in accordance with one or more examples of the disclosure.

FIG. 4 illustrates an example environment 400 including comparing a maximum curvature of a candidate path with a maximum curvature of a vehicle. Specifically, FIG. 4 illustrates generating a candidate path to a lane reference and comparing the maximum curvature of the candidate path with the vehicle maximum curvature to determine whether to exclude the object(s) associated with the lane reference from further processing.

In this example, the example environment 400 may include a vehicle 402 navigating an environment. As shown, the vehicle 402 may be navigating along a lane reference 404 of a driving lane. The example environment 400 may also include a lane reference 406 which may be laterally adjacent to the lane reference 404. As shown in FIG. 4, the vehicle 402 may generate a candidate path 408 from the current vehicle pose to the lane reference 406. That is, the vehicle 402 may determine a target pose 410 associated with an end point of the lane reference 406 and a target heading of the vehicle 402. That is, the lane reference 406 may include an end point which may be represented as an x-y coordinate. The vehicle 402 may associate the end point of the lane reference 406 as the target position. As such, the target pose 410 may be the end point of the lane reference 406 and a heading associated with the lane reference 406.

In some cases, the vehicle 402 may determine a maximum curvature of the candidate path 408. When determining the maximum curvature, the vehicle may discretize the candidate path 408 into multiple segments. The number and/or spacing of the segments may be based on a distance between the vehicle 402 and the target pose 410. In this case, FIG. 4 illustrates that the candidate path 408 may be segmented into nine segments; however, in other cases, the candidate path 408 may be discretized into more or fewer segments. In this example, the candidate path 408 may include a segment 412, a segment 414, a segment 416, a segment 418, and/or various other segments. As shown in table 420, when determining the maximum curvature of the candidate path 408, the vehicle may determine the curvature of some or all segments of the candidate path 408. The vehicle may determine the curvature of each segment by using Equation 4 as described above. In this example, table 420 illustrates that the curvature of segment 412 may be 0.5, the curvature of segment 414 may be 0.46, the curvature of segment 416 may be 0.46, and the curvature of segment 418 may be 0.41. As such, based on determining the curvature of each segment of the candidate path 408, the vehicle may identify the largest (or the maximum) curvature between the different segments. In this case, the segment 412 may have the highest curvature between the different segments. As such and as shown in table 422, the vehicle 402 may compare the maximum curvature of the candidate path 408 (e.g., curvature of segment 412) with the maximum curvature of the vehicle. In this example, the table 422 indicates that the maximum curvature of the vehicle may be 0.55 and the maximum curvature of the candidate path 408 may be 0.50. As such, since the maximum curvature of the vehicle is larger than that of the candidate path 408, the vehicle 402 may determine that the lane reference 406 may be reachable and as such, the vehicle 402 may include any object(s) associated thereto in further processing to identify relevant object(s) and/or relevant object trajectories FIG. 5 depicts an example environment 500 and an example occupancy map used to determine whether an object and a vehicle overlap (e.g., spatially and temporally) at a cell of an occupancy map.

Figure 5:
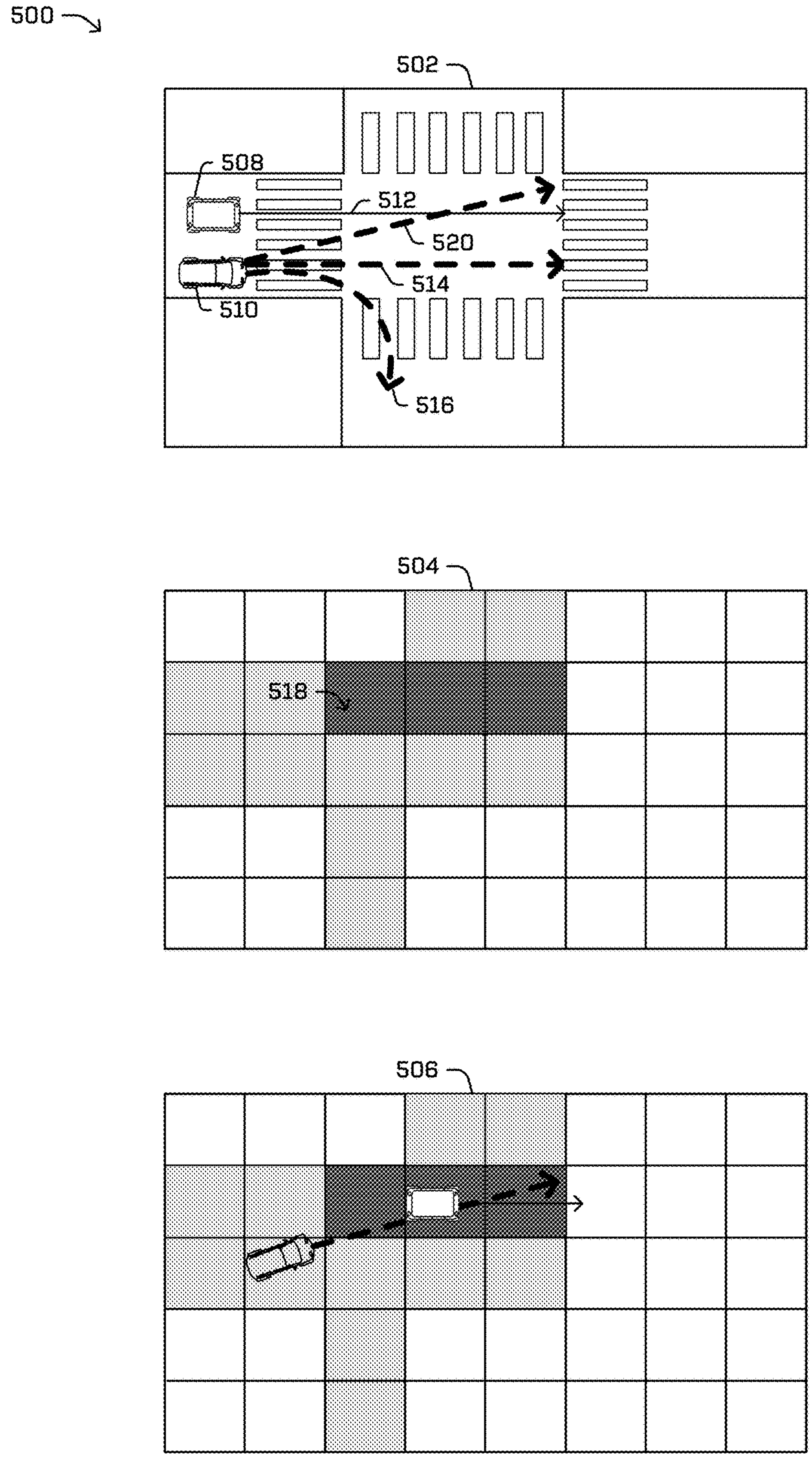
FIG. 5 depicts an example environment and an example occupancy map used to determine whether an object and a vehicle overlap (e.g., spatially and temporally) at a cell of an occupancy map, in accordance with one or more examples of the disclosure.

In this example, FIG. 5 may include a box 502 illustrating an example environment 500 which may include a vehicle 508 and an object 510. As shown, the vehicle 508 may include a trajectory 512 which may instruct the vehicle 508 to navigate through the intersection. Further, the object 510 may include a predicted trajectory 514 that instructs the object to navigate through the intersection, a predicted trajectory 516 that instructs the object to perform a right turn maneuver upon entering the intersection, and a predicted trajectory 520 that instructs the object 510 to perform a lane change maneuver. In this situation, the vehicle 508 may determine the relevance of the object 510 and/or the relevance of the predicted trajectories based on determining whether the predicted trajectories of the object 510 and the trajectory 512 of the vehicle 508 cause the object 510 and the vehicle 508 to interact (or collide) at a future time. In such cases, the vehicle 508 may generate an occupancy grid and determine whether the object 510 and the vehicle 508 spatially and temporally overlap.

As shown, FIG. 5 may include a box 504 which may represent an occupancy grid with one or more cells. In this example, the occupancy grid may include eight columns and five rows; however, in other examples, the occupancy grid may include more or less columns and/or rows. In this example, the vehicle 508 may determine which cell(s) of the occupancy grid the object 510 and the vehicle 508 are predicted to occupy based on following the predicted trajectories of the object and the trajectory 512. That is, the vehicle 508 may tag each cell which may be occupied by the object 510 based on following any of the predicted object trajectories. Further, the vehicle 508 may tag each cell that may be occupied by the vehicle 508 based on the vehicle 508 following the trajectory 512. As shown, the occupancy grid may have light grey cells to indicate cells that are likely to be occupied by the object 510 or the vehicle 508. Further, the occupancy grid may have three dark grey cells 518 which may represent the cells that are likely to be occupied by both the object 510 and the vehicle 508. The dark grey cells 518 indicates a spatial overlap of the object 510 and the vehicle 508. Based on the spatial overlap, the vehicle 508 may determine whether there is a temporal overlap at the cells 518.

As shown, FIG. 5 may include a box 506 which may represent the occupancy grid and where the object 510 and the vehicle 508 may be positioned temporally with respect to the cells 518. As indicated above, when determining whether the object 510 temporally overlaps with the vehicle 508 at cells 518, the vehicle 508 may determine whether object 510 can affect the decision making of the vehicle 508. If the object 510 can affect the decision making of the vehicle 508, the vehicle may determine that the object 510 is relevant to the vehicle 508. In some examples, the vehicle 508 may determine that the object 510 does not affect the decision making of the vehicle 508 if a minimum time of arrival (e.g., the fastest the object 510 can arrive at cells 518) of the object 510 to cells 518 is greater than a maximum time (e.g., the slowest the vehicle 508 can arrive at the cells 518 based on the trajectory) of arrival of the vehicle 508 at the cells 518 (e.g., $t_{object\_min} > t_{vehicle\_max} + \Delta t$). As shown in box 506, the location of the vehicle 508 may represent where the vehicle 508 may be positioned according to the maximum time of the vehicle 508 to arrive at the cells 518. Further, the location of the object 510 may represent where the object 510 may be positioned according to the minimum time of the object 510 to arrive at cells 518. As such, since the vehicle 508 arrives at cells 518 prior to the object 510, the vehicle may determine that the maximum time of arrival for the vehicle 508 to cells 518 is less than the minimum time of arrival of the object 510 to the cells 518. As such, the vehicle 508 may determine that the object 510 is irrelevant and may exclude the object 510 from further processing.

Though FIG. 5 describes a situation in which there is not a temporal overlap, in other examples, the relevance filter may determine that the object 510 and the vehicle 508 are predicted to have a spatial and temporal overlap. In this example, the relevance filter may identify the states of the trajectory 520 that are located with the cells 518. Further, the relevance filter may determine interaction scores for each of the states of the trajectory 520 that are located with the cells 518. Based on determining the interaction scores, the relevance filter may determine a relevance score for the trajectory 520 using the techniques described above.

Figure 6:
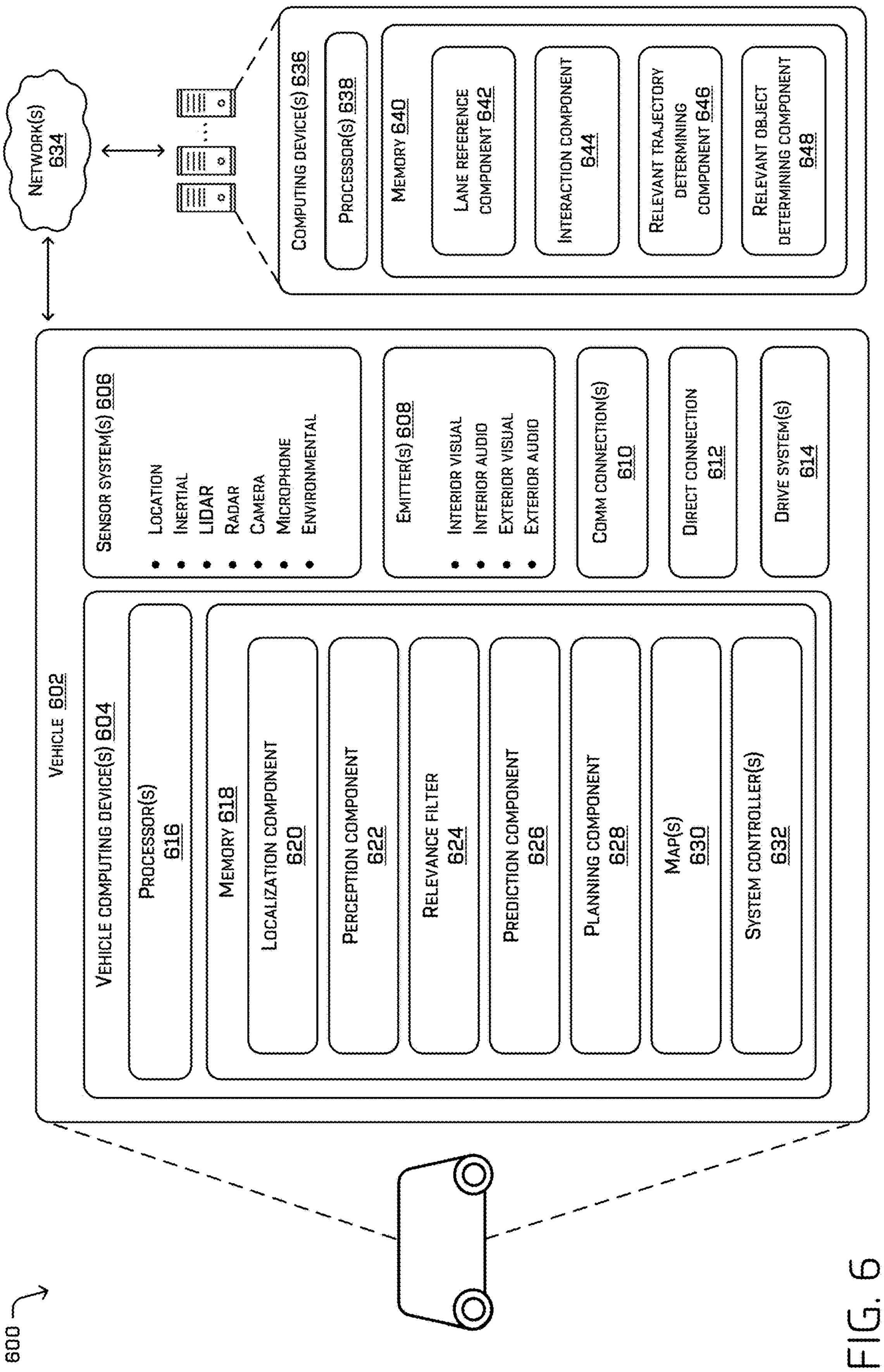
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, a relevance filter 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622, the relevance filter 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include a lane reference component 642, an interaction component 644, a relevant trajectory determining component 646, and/or a relevant object determining component 648.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior. Additionally, the prediction component 626 may be perform any of the techniques described with respect to any of FIGS. 1-6 above with respect to receiving, retrieving, determining, and/or generating predicted trajectories for object(s) within the environment.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The relevance filter 624 may perform any of the techniques described with respect to any of FIGS. 1-5 above with respect to identifying relevant object(s) and/or relevant object trajectories.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pretrained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the relevance filter 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the relevance filter 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a lane reference component 642, an interaction component 644, a relevant trajectory determining component 646, and/or a relevant object determining component 648. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the lane reference component 642, the interaction component 644, the relevant trajectory determining component 646, and/or the relevant object determining component 648 may perform substantially similar functions as the relevance filter 624.

The processor(s) 616 of the vehicle 602 and the processor (s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
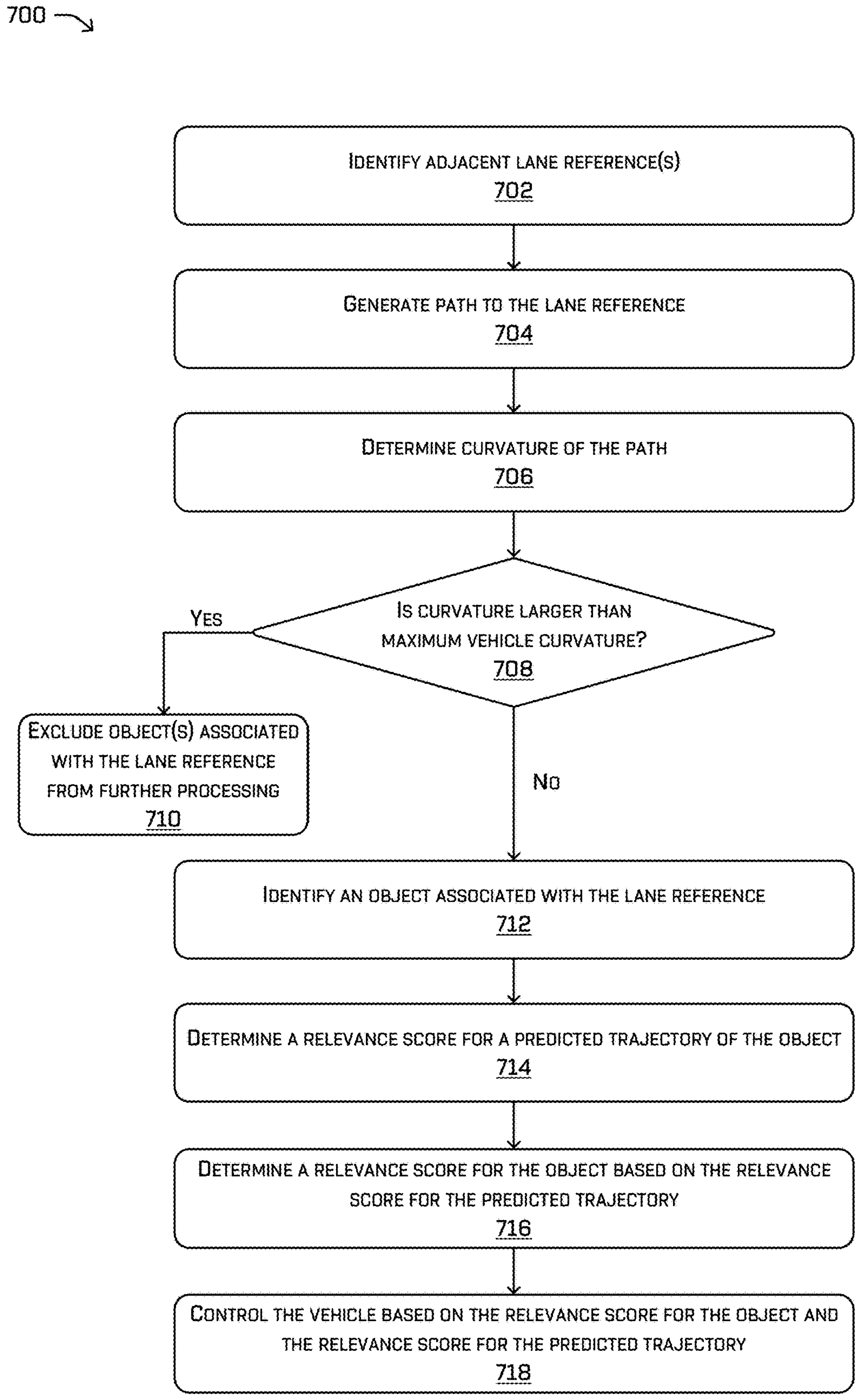
FIG. 7 is a flow diagram illustrating an example process for identifying an adjacent lane reference, generating a candidate path to the lane reference, determining a curvature of the candidate path, determining whether to exclude the object(s) associated with the lane reference based on comparing the curvature of the candidate path with the maximum vehicle curvature, determining an overlap between the vehicle and the object, determining a relevance score for the object and an object trajectory, controlling the vehicle based on the relevance score(s), in accordance with one or more examples of the disclosure.

FIG. 7 is a flow diagram illustrating an example process for identifying an adjacent lane reference, generating a candidate path to the lane reference, determining a curvature of the candidate path, determining whether to exclude the object(s) associated with the lane reference based on comparing the curvature of the candidate path with the maximum vehicle curvature, determining an overlap between the vehicle and the object, determining a relevance score for the object and the trajectory, controlling the vehicle based on the relevance score(s). As described below, the example process 700 may be performed by one or more computer-based components configured to implement various functionalities described herein. For instances, process 700 may be performed using a relevance filter 302.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations.

Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the vehicle may identify adjacent lane reference(s). That is, while navigating to the destination, the vehicle may travel within a driving lane. The vehicle may determine which driving lane the vehicle is located within by receiving map data which may indicate which of the one or more driving lanes the vehicle is associated with. Accordingly, based on the vehicle being located within a specific driving lane, the vehicle may identify one or more adjacent lane references based on the map data. A lane reference may be a center line of a driving lane and/or a line that runs substantially parallel to the lane markings of a driving lane. In some examples, the lane reference(s) may be tagged and/or annotated in map data. The map data may include information (e.g., static information) about the environment such as road information (e.g., road locations, road segment identifiers, reference line information (e.g., start location, end location, heading, shape, length, curvature, angle, distance to the road boarder, etc.). Accordingly, the vehicle may access the map data and retrieve a list of one or more lane references that are laterally adjacent to the driving lane occupied by the vehicle.

At operation 704, the vehicle may generate a path to the lane reference. A candidate path may be a spatial representation of potential movements of the vehicle. To generate the candidate path, the vehicle may identify a current pose (e.g., position and/or orientation) of the vehicle within the environment. Further, the vehicle may identify a target pose (e.g., x, y, heading) of the vehicle based on the end point of the lane reference. That is, the vehicle may identify the end point (e.g., x-y coordinate) of the lane reference and use the end point to determine a target pose. In some examples, however, the vehicle may determine multiple target poses based on determining an offset heading value. For example, the vehicle may determine a target x-y coordinate and also determine multiple target heading values. Specifically, based on the target heading value, the vehicle may determine a first offset target heading (e.g., minimum heading angle) and a second offset target heading (e.g., maximum heading angle). In this case, the vehicle may generate first candidate path based on the x-y coordinate and the first offset target heading and a second candidate path based on the x-y coordinate and the second offset heading. However, this is not intended to be limiting; in other examples, the vehicle may generate a single candidate path based on a target pose at the ending location of the reference line and in other examples the vehicle may generate multiple candidate paths. The vehicle may generate the candidate path using Equations 1-3.

At operation 706, the vehicle may determine a curvature of the path. Based on generating the candidate path, the vehicle may determine maximum curvature of the candidate path. In some examples, the vehicle may discretize the candidate path into n-number of segments based on the length d (e.g., the distance from the current vehicle position to the target position). The vehicle may determine a curvature value for each discretized segment of the candidate path. For example, the vehicle may discretize the candidate path into three segments and as such, the vehicle may determine a unique curvature value for each of the three segments. The vehicle may determine the curvature using Equation 4.

At operation 708, the vehicle may determine whether the curvature of the path is larger than the maximum curvature of the vehicle. For example, the vehicle may determine a maximum curvature of the vehicle. The vehicle may include a database that contains various kinematic capabilities of the vehicle. In some cases, the database may include a lookup table that includes data indicative of the maximum curvature of the vehicle based on a velocity of the vehicle. The vehicle can determine a current velocity of the vehicle and use the current velocity to determine a maximum curvature of the vehicle from the database. In some examples, the maximum curvature between the candidate paths may be the lower of the two curvatures. That is, the maximum curvature being compared with the maximum curvature of the vehicle may be the lower curvature between the two candidate paths. Based on identifying the maximum curvature of the candidate path(s), the vehicle may compare the maximum curvature of the candidate path(s) with the maximum curvature of the vehicle. If the maximum curvature of the candidate path(s) is greater than (or exceeds) the maximum curvature of the vehicle (708: Yes), the vehicle may exclude the object(s) located within the driving lane associated with the lane reference from further processing and/or may indicate that such object(s) are non-relevant objects. That is, at operation 710, the vehicle may determine to exclude the object(s) associated with the lane reference from further processing. Further, the vehicle may tag such object(s) as irrelevant.

In contrast, if the maximum curvature of the candidate path(s) is not greater than the maximum curvature of the vehicle (708: No), the vehicle may include the object(s) located within the driving lane associated with the lane reference in further processing. That is, at operation 712, the vehicle may identify an object associated with the lane reference. The vehicle may identify one or more objects located within the driving lane associated with the lane reference. In such examples, the vehicle may include one or more sensor devices (e.g., lidar device(s), radar device(s), image capturing device(s), time-of-flight device(s), etc.) configured to capture sensor data of the environment. The vehicle may analyze such sensor data to detect object(s) in the driving lane associated with the lane reference to which the vehicle can navigate.

At operation 714, the vehicle may determine a relevance score for a predicted trajectory of the object. To determine the relevance score, the relevance filter may determine whether there is an overlap between the object and the vehicle. In some examples, the vehicle may determine interaction scores corresponding to trajectories of the object based on a spatial and temporal overlap of the object and the vehicle. The vehicle may generate and/or receive one or more predicted trajectories associated with the object. That is, a prediction system of the vehicle may predict future trajectories that the object may follow and/or a probability that the object will follow the trajectories. In some examples, the vehicle may use such predicted object trajectories when determining whether the object is predicted to overlap spatially and/or temporally with the vehicle. Based on receiving or generating the object trajectories, the vehicle may generate an occupancy map (or occupancy grid). An occupancy map may be a map or grid that covers a region of the environment, discretized into a plurality of cells, and indicates whether the object or the vehicle are predicted to occupy a cell at any point. That is, the occupancy map may be a discretized grid that covers the region of the environment upon which the vehicle navigates. The occupancy map represents portions of the environment that cover the vehicle's trajectories (e.g., current trajectory and/or candidate trajectories). In some examples, the vehicle may generate an occupancy grid that based on a predefined length and width (e.g., 100 meters×20 meters, etc.). The occupancy map may include various object(s) within the environment.

In some examples, the vehicle may determine which cell(s) of the occupancy map the object is predicted to occupy and which cells of the occupancy map the vehicle is predicted to occupy. That is, the vehicle may determine a spatial overlap of the cells for the vehicle and for the object. In such cases, the vehicle may determine a list of one or more cells in the occupancy map that the object is predicted to occupy (e.g., spatially) based on the x-y coordinates of the predicted object trajectories. The object trajectories may include one or more states which may represent the predicted pose (e.g., position (e.g., x-y coordinate) and/or heading) of the object along the predicted trajectory. As such, the vehicle may identify, at each state of the predicted trajectory, which cell(s) the object is predicted to occupy. The vehicle may tag such cell(s) as potentially occupied by the object. Further, the vehicle may determine which cells of the occupancy map that the vehicle is predicted to occupy (e.g., spatially) based on the x-y coordinates of the trajectory of the vehicle. That is, a trajectory may include one or more states that represent the predicted vehicle state (e.g., pose data, velocity data (e.g., minimum and maximum), etc.) of the vehicle. As such, the vehicle may identify, for each state of the trajectory, which cell(s) of the occupancy map the vehicle is predicted to occupy and the vehicle may tag such cell(s) as being potential occupied by the vehicle.

Based on determining which cells of the occupancy map the vehicle and the object are predicted to occupy, the vehicle may determine whether the vehicle and the object are predicted to occupy one or more of the same cells. That is, the vehicle may evaluate the cells of the occupancy map and determine whether there are any cells that have been identified (or tagged) as being occupied by the object and the vehicle. If a cell has been tagged as being occupied by both the object and the vehicle, the vehicle may indicate that there is a potential spatial overlap with the object of interest.

Based on the vehicle and the object occupying a same cell of the occupancy map, the vehicle may determine whether the object and the vehicle occupy the cell within a similar range of times. That is, the vehicle may determine whether the object can affect the decision making of the vehicle which may be indicative of a temporal overlap at the cell at which there is a spatial overlap. An object may not affect the vehicle's decision making if a minimum time of arrival of the object to the cell is greater than a maximum time of arrival of the vehicle at the same cell plus a buffer of time (e.g., $t_{object\_min}>t_{vehicle\_max}+\Delta t$). That is, if the vehicle passed the location of the cell prior to the arrival of the object, the vehicle may determine that the object does not affect the way in which the vehicle operates and that there may not be a temporal overlap. However, if the object arrives to the cell prior to the vehicle or at the same time as the vehicle, the vehicle may determine that the object can affect the way in which the vehicle operates and that there may be a temporal overlap. As such, the vehicle may determine time values (e.g., minimum arrival time and/or maximum arrival time) corresponding to when the object may be located at or within a specific cell of the occupancy map. In some examples, the vehicle may determine, based on the predicted trajectories, a minimum and/or maximum arrival time of the object. In some examples, the vehicle may determine, based on the vehicle's trajectory, a minimum and/or maximum arrival time of the vehicle based on the vehicle's dynamics and/or capabilities (e.g., maximum and minimum accelerations, maximum and minimum velocities, current velocity, current steering angle, current heading angle, maximum and minimum steering angles/rates, etc.). That is, each state of the trajectory may include time data which may indicate a predicted maximum and/or minimum time arrival at the location of the state.

Based on the object of interest overlapping with the vehicle spatially and temporally, the vehicle may determine an interaction score (or relevance score) corresponding to states of the predicted object trajectories. The interaction score may indicate the degree (or level) of relevance of the state of the predicted object trajectory with respect to the vehicle. The interaction score may increase when the overlap (or potential collision) is predicted to occur sooner (e.g., the sum of $t_{object\_min}$ and $t_{vehicle\_min}$ is low). In contrast, the relevance score may decrease when the sum of $t_{object\_min}$ and $t_{vehicle\_min}$ increases (i.e., when the interaction occurs later). In such examples, the vehicle may determine scores (or sub-scores) that represent the relevance of the predicted object trajectory at each state of the predicted object trajectory located within the overlapping cell. In at least some examples, the score may be an exponential of a product of a weight and the sum (such that the score is proportional to $e^{-w*(t_{object\_min}+t_{vehicle\_min})}$). The vehicle may determine a unique interaction score for each state of the predicted object trajectory located within the overlapping cell. As described below, the vehicle may utilize the interaction scores of the states associated with the object trajectory to determine an object trajectory relevance score and/or an object relevance score.

In some examples, the vehicle may determine a relevance score corresponding to the object trajectory based on the interaction scores (or set of scores) of the states (or set of states). The purpose of determining relevance scores for the predicted trajectories of the object is to be able to determine which of the predicted trajectories are more relevant to the vehicle than others. This may be especially important if a relevance filtering system evaluates a finite number of trajectories for each object. As such, the vehicle may determine a relevance score for the object trajectory by evaluating the individual state interaction scores. That is, the vehicle may perform a max pooling, down sampling technique. For example, the vehicle may identify the states of the trajectory with interaction scores and group these states into clusters. In this case, each cluster may include two states; however, in other examples, the clusters may include more or fewer states. Based on clustering the states, the vehicle may down sample the states by selecting a single state with the highest interaction score from each cluster (e.g., results in a subset of scores). For example, if a cluster has a first state with an interaction score of 0.4 and a second state with an interaction score of 0.9, the vehicle may select the second state since the second state has a higher interaction score. The vehicle may determine the object trajectory relevance score using Equations 5 and 6.

At operation 716, the vehicle may determine a relevance score for the object based on the relevance score for the predicted trajectory. In some examples, the vehicle may determine a relevance score of the object based on the relevance scores of the object trajectories. To determine the relevance score of an object, the vehicle may evaluate the relevance scores of each of the predicted trajectories corresponding to the object and/or the probabilities of such predicted trajectories. The vehicle may determine the object relevance score based on using Equation 7.

At operation 718, the vehicle may control the vehicle based on the relevance score for the object and the relevance score for the predicted trajectory. In some examples, the vehicle may send data associated with one or more of the object(s) with the highest relevance scores and/or scores which meet or exceed a threshold relevance score to a prediction and/or planning component. The vehicle may determine a threshold number of object(s) which may be sent to prediction and/or planning components. In such cases, the vehicle may identify the object(s) with the highest relevance scores that are above the threshold number. The identified object(s) may be sent to the prediction and/or planning components for further processing and may ultimately be used to control the vehicle. In some examples, the number of object(s) to send to the prediction and/or planning components may be based on an amount of processing power and/or memory available for a processing operation (e.g., to ensure that a number of object(s) can be considered within a particular period of time).

In addition to sending the number of object(s) with the highest relevance scores, the vehicle may send data associated with one or more of the predicted trajectories with the highest relevance scores and/or scores which meet or exceed a threshold relevance score to a prediction and/or planning component. As discussed above, some prediction and/or planning components may limit the number of predicted trajectories that may be sent and/or evaluated. As such, the vehicle may leverage the trajectory relevance scores to determine which predicted trajectories are most important to send to the downstream components. In this example, the vehicle may identify the predicted trajectories with the highest relevance scores that are above the threshold. The identified predicted trajectories may be sent to the prediction and/or planning components for further processing and may ultimately be used to control the vehicle. In some examples, the number of predicted trajectories to send to the prediction and/or planning components may be based on an amount of processing power and/or memory available for a processing operation (e.g., to ensure that one or more predicted trajectories can be considered within a particular period of time).

EXAMPLE CLAUSES

A: A system comprising: one or more processors; and one or more non-transitory computer-readable media storing computer-executable instructions that, when executed, cause the system to perform operations comprising: determining, based at least in part on sensor data, a position of a vehicle in an environment; receiving, based at least in part on the position, map data associated with the environment; determining, based at least in part on the map data and the position, that the vehicle is located within a first driving lane; identifying, based at least in part on the map data, a lane reference associated with a second driving lane that is laterally adjacent to the first driving lane; determining a first maximum curvature associated with controlling the vehicle; generating a candidate path from the position of the vehicle to the lane reference; determining a second maximum curvature of the candidate path; determining, as a comparison, that the first maximum curvature of the vehicle is less than the second maximum curvature of the candidate path; causing, based at least in part on the comparison, an object located within the second driving lane to be excluded from a list of relevant objects; and controlling the vehicle based at least in part on the list of relevant objects.

B: The system of paragraph A, wherein determining the second maximum curvature of the candidate path comprises: discretizing the candidate path into a first segment and a second segment; determining a third maximum curvature of the first segment; determining a fourth maximum curvature of the second segment; and determining, based at least in part on the third maximum curvature of the first segment being less than the fourth maximum curvature of the second segment, that the fourth maximum curvature of the second segment is the second maximum curvature of the candidate path.

C: The system of paragraph A, wherein the object is a first object, the operations further comprising: determining that a curvature of a second candidate path to a second lane reference associated with a third driving lane is less than the first maximum curvature for the vehicle; identifying a second object located within the third driving lane, the second object including a candidate trajectory; determining that the candidate trajectory of the object and a trajectory of the vehicle include a spatial overlap and a temporal overlap; determining, based at least in part on the spatial overlap and the temporal overlap, a relevance score associated with the second object; and determining, based at least in part on the relevance score, that the second object is a relevant object.

D: The system of paragraph C, wherein determining the relevance score is based at least in part on: determining, based at least in part on the spatial overlap and the temporal overlap, a set of scores, a score of the set of scores associated with a state of a plurality of states associated with the candidate trajectory; determining clusters of the set of scores; determining, based at least in part on identifying a maximum score from a cluster of the clusters, a subset of scores associated with the set of scores; determining, based at least in part on the subset of scores, an overall score associated with the candidate trajectory; and determining, based at least in part on the overall score, the relevance score of the second object.

E: The system of paragraph A, wherein the candidate path is a first candidate path, wherein determining the first candidate path is based at least in part on a first offset of a target heading associated with the lane reference, the operations further comprising: generating, based at least in part on a second offset of the target heading, a second candidate path from the position of the vehicle to the lane reference, the second candidate path being different than the first candidate path; determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

F: One or more non-transitory computer-readable media storing instructions executable by one or more processors, wherein the instructions, when executed, cause a system to perform operations comprising: determining that a vehicle is located within a first driving lane; identifying, based at least in part on map data, a lane reference associated with a second driving lane that is proximate to the first driving lane; determining a first maximum curvature associated with controlling the vehicle; generating a candidate path from the vehicle to the lane reference; determining a second maximum curvature of the candidate path; determining, as a comparison, that the first maximum curvature of the vehicle is less than the second maximum curvature of the candidate path; and causing, based at least in part on the comparison, an object located within the second driving lane to be excluded from a list of relevant objects.

G: The one or more non-transitory computer-readable media of paragraph F, wherein determining the second maximum curvature of the candidate path is based at least in part on: determining that the second maximum curvature is a highest curvature along the candidate path.

H: The one or more non-transitory computer-readable media of paragraph F, wherein the object is a first object, the operations further comprising: determining that a curvature of a second candidate path to a second lane reference associated with a third driving lane is less than the first maximum curvature for the vehicle; identifying a second object located within the third driving lane; and determining that the second object is a relevant object.

I: The one or more non-transitory computer-readable media of paragraph H, wherein determining that the second object is the relevant object is based at least in part on: determining a candidate trajectory associated with the second object; determining that the candidate trajectory of the second object and a trajectory of the vehicle include a spatial overlap and a temporal overlap; determining, based at least in part on the spatial overlap and the temporal overlap, a relevance score associated with the second object; and determining, based at least in part on the relevance score, that the second object is a relevant object.

J: The one or more non-transitory computer-readable media of paragraph I, wherein determining the relevance score is based at least in part on: determining, based at least in part on the spatial overlap and the temporal overlap, a set of scores each associated with a state of a plurality of states associated with the candidate trajectory; determining clusters of the set of scores; determining, based at least in part on identifying a maximum score from each cluster of the clusters, a subset of scores associated with the set of scores; determining, based at least in part on the subset of scores, an overall score associated with the candidate trajectory; and determining, based at least in part on the overall score, the relevance score of the second object.

K: The one or more non-transitory computer-readable media of paragraph F, wherein the candidate path is a first candidate path, wherein determining the first candidate path is based at least in part on a first offset of a target heading associated with the lane reference, the operations further comprising: generating, based at least in part on a second offset of the target heading, a second candidate path from the vehicle to the lane reference, the second candidate path being different than the first candidate path; determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

L: The one or more non-transitory computer-readable media of paragraph F, wherein generating the first maximum curvature of the vehicle is based at least in part on: determining a velocity associated with the vehicle; and determining, based at least in part on the velocity, the first maximum curvature of the vehicle.

M: The one or more non-transitory computer-readable media of paragraph F, wherein generating the candidate path is based at least in part on: determining a target pose associated with the lane reference, the target pose comprising: a position associated with an end point of the lane reference, and a heading associated with the lane reference.

N: The one or more non-transitory computer-readable media of paragraph F, the operations further comprising: controlling the vehicle based at least in part on the list of relevant objects.

O: A method comprising: determining that a vehicle is located within a first driving lane; identifying, based at least in part on map data, a lane reference associated with a second driving lane that is proximate to the first driving lane; determining a first maximum curvature associated with controlling the vehicle; generating a candidate path from the vehicle to the lane reference; determining a second maximum curvature of the candidate path; determining, as a comparison, that the first maximum curvature of the vehicle is less than the second maximum curvature of the candidate path; and causing, based at least in part on the comparison, an object located within the second driving lane to be excluded from a list of relevant objects.

P: The method of paragraph O, wherein determining the second maximum curvature of the candidate path is based at least in part on: determining that the second maximum curvature is a highest curvature along the candidate path.

Q: The method of paragraph O, wherein the object is a first object, further comprising: determining that a curvature of a second candidate path to a second lane reference associated with a third driving lane is less than the first maximum curvature for the vehicle; identifying a second object located within the third driving lane; and determining that the second object is a relevant object.

R: The method of paragraph Q, wherein determining that the second object is the relevant object is based at least in part on: determining a candidate trajectory associated with the second object; determining that the candidate trajectory of the second object and a trajectory of the vehicle include a spatial overlap and a temporal overlap; determining, based at least in part on the spatial overlap and the temporal overlap, a relevance score associated with the second object; and determining, based at least in part on the relevance score, that the second object is a relevant object.

S: The method of paragraph R, wherein determining the relevance score is based at least in part on: determining, based at least in part on the spatial overlap and the temporal overlap, a set of scores each associated with a state of a plurality of states associated with the candidate trajectory; determining clusters of the set of scores; determining, based at least in part on identifying a maximum score from each cluster of the clusters, a subset of scores associated with the set of scores; determining, based at least in part on the subset of scores, an overall score associated with the candidate trajectory; and determining, based at least in part on the overall score, the relevance score of the second object.

T: The method of paragraph O, wherein the candidate path is a first candidate path, wherein determining the first candidate path is based at least in part on a first offset of a target heading associated with the lane reference, further comprising: generating, based at least in part on a second offset of the target heading, a second candidate path from the vehicle to the lane reference, the second candidate path being different than the first candidate path; determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, “may,” “could,” “may” or “might,” unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase “at least one of X, Y or Z,” unless specifically stated otherwise, is to be understood to present that an item, term, etc. may be either X, Y, or Z, or any combination thereof, including multiples of each element. Unless explicitly described as singular, “a” means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and one or more non-transitory computer-readable media storing computer-executable instructions that, when executed, cause the system to perform operations comprising:

determining, based at least in part on sensor data, a position of a vehicle in an environment;

receiving, based at least in part on the position, map data associated with the environment;

determining, based at least in part on the map data and the position, that the vehicle is located within a first driving lane;

identifying, based at least in part on the map data, a lane reference associated with a second driving lane that is laterally adjacent to the first driving lane;

determining a first maximum curvature associated with controlling the vehicle;

generating a candidate path from the position of the vehicle to the lane reference;

determining a second maximum curvature of the candidate path;

determining, as a comparison, that the first maximum curvature of the vehicle is less than the second maximum curvature of the candidate path;

causing, based at least in part on the comparison, an object located within the second driving lane to be excluded from a list of relevant objects; and controlling one or more of steering, propulsion, acceleration, or braking of the vehicle based at least in part on the list of relevant objects.

2. The system of claim 1, wherein determining the second maximum curvature of the candidate path comprises:

discretizing the candidate path into a first segment and a second segment;

determining a third maximum curvature of the first segment;

determining a fourth maximum curvature of the second segment; and determining, based at least in part on the third maximum curvature of the first segment being less than the fourth maximum curvature of the second segment, that the fourth maximum curvature of the second segment is the second maximum curvature of the candidate path.

3. The system of claim 1, wherein the object is a first object, the operations further comprising:

determining that a curvature of a second candidate path to a second lane reference associated with a third driving lane is less than the first maximum curvature for the vehicle;

identifying a second object located within the third driving lane, the second object including a candidate trajectory;

determining that the candidate trajectory of the object and a trajectory of the vehicle include a spatial overlap and a temporal overlap;

determining, based at least in part on the spatial overlap and the temporal overlap, a relevance score associated with the second object; and determining, based at least in part on the relevance score, that the second object is a relevant object.

4. The system of claim 3, wherein determining the relevance score is based at least in part on:

determining, based at least in part on the spatial overlap and the temporal overlap, a set of scores, a score of the set of scores associated with a state of a plurality of states associated with the candidate trajectory;

determining clusters of the set of scores;

determining, based at least in part on identifying a maximum score from a cluster of the clusters, a subset of scores associated with the set of scores;

determining, based at least in part on the subset of scores, an overall score associated with the candidate trajectory; and determining, based at least in part on the overall score, the relevance score of the second object.

5. The system of claim 1, wherein the candidate path is a first candidate path, wherein determining the first candidate path is based at least in part on a first offset of a target heading associated with the lane reference, the operations further comprising:

generating, based at least in part on a second offset of the target heading, a second candidate path from the position of the vehicle to the lane reference, the second candidate path being different than the first candidate path;

determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

6. The system of claim 1, wherein generating the first maximum curvature of the vehicle is based at least in part on:

determining a velocity associated with the vehicle; and determining, based at least in part on the velocity, the first maximum curvature of the vehicle.

7. One or more non-transitory computer-readable media storing instructions executable by one or more processors, wherein the instructions, when executed, cause a system to perform operations comprising:

determining that a vehicle is located within a first driving lane;

identifying, based at least in part on map data, a lane reference associated with a second driving lane that is proximate to the first driving lane;

determining a first maximum curvature associated with controlling the vehicle;

generating a candidate path from the vehicle to the lane reference;

determining a second maximum curvature of the candidate path;

determining, as a comparison, that the first maximum curvature of the vehicle is less than the second maximum curvature of the candidate path;

causing, based at least in part on the comparison, an object located within the second driving lane to be excluded from a list of relevant objects; and controlling one or more of steering, propulsion, acceleration, or braking of the vehicle based at least in part on the list of relevant objects.

8. The one or more non-transitory computer-readable media of claim 7, wherein determining the second maximum curvature of the candidate path is based at least in part on:

determining that the second maximum curvature is a highest curvature along the candidate path.

9. The one or more non-transitory computer-readable media of claim 7, wherein the object is a first object, the operations further comprising:

determining that a curvature of a second candidate path to a second lane reference associated with a third driving lane is less than the first maximum curvature for the vehicle;

identifying a second object located within the third driving lane; and determining that the second object is a relevant object.

10. The one or more non-transitory computer-readable media of claim 9, wherein determining that the second object is the relevant object is based at least in part on:

determining a candidate trajectory associated with the second object;

determining that the candidate trajectory of the second object and a trajectory of the vehicle include a spatial overlap and a temporal overlap; and determining, based at least in part on the spatial overlap and the temporal overlap, a relevance score associated with the second object.

11. The one or more non-transitory computer-readable media of claim 10, wherein determining the relevance score is based at least in part on:

determining, based at least in part on the spatial overlap and the temporal overlap, a set of scores each associated with a state of a plurality of states associated with the candidate trajectory;

determining clusters of the set of scores;

determining, based at least in part on identifying a maximum score from each cluster of the clusters, a subset of scores associated with the set of scores;

determining, based at least in part on the subset of scores, an overall score associated with the candidate trajectory; and determining, based at least in part on the overall score, the relevance score of the second object.

12. The one or more non-transitory computer-readable media of claim 7, wherein the candidate path is a first candidate path, wherein determining the first candidate path is based at least in part on a first offset of a target heading associated with the lane reference, the operations further comprising:

generating, based at least in part on a second offset of the target heading, a second candidate path from the vehicle to the lane reference, the second candidate path being different than the first candidate path;

determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

13. The one or more non-transitory computer-readable media of claim 7, wherein generating the first maximum curvature of the vehicle is based at least in part on:

determining a velocity associated with the vehicle; and determining, based at least in part on the velocity, the first maximum curvature of the vehicle.

14. The one or more non-transitory computer-readable media of claim 7, wherein generating the candidate path is based at least in part on:

determining a target pose associated with the lane reference, the target pose comprising:

a position associated with an end point of the lane reference, and a heading associated with the lane reference.

15. A method comprising:

determining that a vehicle is located within a first driving lane;

identifying, based at least in part on map data, a lane reference associated with a second driving lane that is proximate to the first driving lane;

determining a first maximum curvature associated with controlling the vehicle;

generating a candidate path from the vehicle to the lane reference;

determining a second maximum curvature of the candidate path;

determining, as a comparison, that the first maximum curvature of the vehicle is less than the second maximum curvature of the candidate path;

causing, based at least in part on the comparison, an object located within the second driving lane to be excluded from a list of relevant objects; and controlling one or more of steering, propulsion, acceleration, or braking of the vehicle based at least in part on the list of relevant objects.

16. The method of claim 15, wherein determining the second maximum curvature of the candidate path is based at least in part on:

determining that the second maximum curvature is a highest curvature along the candidate path.

17. The method of claim 15, wherein the object is a first object, further comprising:

determining that a curvature of a second candidate path to a second lane reference associated with a third driving lane is less than the first maximum curvature for the vehicle;

identifying a second object located within the third driving lane; and determining that the second object is a relevant object.

18. The method of claim 17, wherein determining that the second object is the relevant object is based at least in part on:

determining a candidate trajectory associated with the second object;

determining that the candidate trajectory of the second object and a trajectory of the vehicle include a spatial overlap and a temporal overlap; and determining, based at least in part on the spatial overlap and the temporal overlap, a relevance score associated with the second object.

19. The method of claim 18, wherein determining the relevance score is based at least in part on:

determining, based at least in part on the spatial overlap and the temporal overlap, a set of scores each associated with a state of a plurality of states associated with the candidate trajectory;

determining clusters of the set of scores;

determining, based at least in part on identifying a maximum score from each cluster of the clusters, a subset of scores associated with the set of scores;

determining, based at least in part on the subset of scores, an overall score associated with the candidate trajectory; and determining, based at least in part on the overall score, the relevance score of the second object.

20. The method of claim 15, wherein the candidate path is a first candidate path, wherein determining the first candidate path is based at least in part on a first offset of a target heading associated with the lane reference, further comprising:

generating, based at least in part on a second offset of the target heading, a second candidate path from the vehicle to the lane reference, the second candidate path being different than the first candidate path;

determining that the second maximum curvature of the first candidate path is larger than a third maximum curvature of the second candidate path; and causing, based at least in part on the second maximum curvature of the first candidate path being larger than the third maximum curvature of the second candidate path, the third maximum curvature of the second candidate path to be compared with the first maximum curvature of the vehicle.

* * * * *